(12) United States Patent
Bukhryakov

(10) Patent No.: US 12,522,622 B1
(45) Date of Patent: Jan. 13, 2026

(54) SYNTHESIS OF NOVEL VANADIUM ALKYLIDYNE COMPLEXES AND THEIR USE IN METATHESIS REACTIONS

(71) Applicant: Konstantin Bukhryakov, Miami, FL (US)

(72) Inventor: Konstantin Bukhryakov, Miami, FL (US)

(73) Assignee: The Florida International University Board of Trustees, Miami, FL (US)

( * ) Notice: Subject to any disclaimer, the term of this patent is extended or adjusted under 35 U.S.C. 154(b) by 0 days.

(21) Appl. No.: 19/197,151

(22) Filed: May 2, 2025

(51) Int. Cl.
*C07F 9/00* (2006.01)
*B01J 31/12* (2006.01)

(52) U.S. Cl.
CPC .................. *C07F 9/00* (2013.01); *B01J 31/12* (2013.01); *B01J 2231/546* (2013.01); *B01J 2531/56* (2013.01)

(58) Field of Classification Search
None
See application file for complete search history.

(56) References Cited

PUBLICATIONS

Pyrrolide anion (NIST Chemistry WebBook, SRD 69, downloaded from https://webbook.nist.gov/cgi/cbook.cgi?ID=C23303095&Mask=8 on Jul. 7, 2025) (Year: 2025).*

1-Adamantanol (Millipore Sigma®, downloaded from https://www.sigmaaldrich.com/US/en/product/aldrich/130346?srsltid=AfmBOopVkJwLqSXRx7HIYK9Somy42029UURqFOCO6qBKHW-qdnm-GN6PF, on Jul. 7, 2025) (Year: 2025).*

UCLA (Illustrated Glossary of Organic Chemistry, downloaded from https://www.chem.ucla.edu/~harding/IGOC/T/trifluoromethanesulfonate.html on Jul. 7, 2025) (Year: 2025).*

Hernandez ("Decreasing the Bond Order between Vanadium and Oxo Ligand to Form 3d Schrock Carbynes" JACS, published Jul. 5, 2024, p. 18905), including the Supporting information p. S1-S26 (Year: 2024).*

Adhikari, Debashis et al. "Zwitterionic and Cationic Titanium and Vanadium Complexes Having Terminal M—C Multiple Bonds: the Role of the B-Diketiminate Ligand in Formation of Charge-Separated Species," Organometallics 28 (14): 4115-4125, 2009.

Basuli, Falguni et al. "Terminal Vanadium—Neopentylidyne Complexes and Intramolecular Cross-Metathesis Reactions to Generatte Azametalacyclohexatrienes," J. Am. Chem. Soc. 126 (34): 10506-10507, 2004.

Hernandez, Shirley et al. "Decreasing the Bond Order Between Vanadium and Oxo Ligand to Form 3d Schrock Carbynes," J. Am. Chem. Soc. 146 (28): 18905-18909, 2024.

Jafari, Mehrafshan G. et al. "Vanadium Alkylidyne Initiated Cyclic Polymer Synthesis: The Importance of a Deprotiovanadacyclobutadiene Moiety," J. Am. Chem. Soc. 146(5): 2297-3009, 2024.

* cited by examiner

*Primary Examiner* — Amy C Bonaparte
(74) *Attorney, Agent, or Firm* — SALIWANCHIK, LLOYD & EISENSCHENK

(57) ABSTRACT

The subject invention provides a series of vanadium alkylidyne complexes with the metal center V being in high oxidation state, as well as novel methods for synthesizing these vanadium alkylidyne complexes using a vanadium oxo trialkoxyl complex as a starting material. The vanadium alkylidyne complexes of the subject invention can be used as catalysts for metathesis reactions.

7 Claims, 18 Drawing Sheets

*A. Alkyne Metathesis*

*B. Mechanism*

| ligand | LDP | %$V_{bur}$ 3.5 Å |
|---|---|---|
| OAd | 10.83 | 21.4 |
| OPh | 12.38 | 18.6 |
| OSiPh$_3$ | 13.28 | 22.2 |
| OBu$^t_{F6}$ | 13.89 | 23.6 |
| SPh | 14.22 | 21.2 |
| OC$_6$F$_5$ | 14.32 | 20.9 |
| Cl | 15.05 | 16.8 |

Chemical Formula: C_{12}H_{32}LiOSi_3V
Molecular Weight: 334.5235

Chemical Formula: C_{18}H_{30}
Molecular Weight: 246.4380

SYNTHESIS OF NOVEL VANADIUM ALKYLIDYNE COMPLEXES AND THEIR USE IN METATHESIS REACTIONS

GOVERNMENT SUPPORT

This invention was made with government support under R35GM150902 awarded by the National Institutes of Health. The government has certain rights in the invention.

BACKGROUND OF THE INVENTION

Alkyne metathesis, the redistribution of R groups between alkynes (FIG. 1A), is an important reaction utilized to produce valuable chemicals containing C≡C triple bonds. The resulting alkynes are essential starting points for producing a large variety of organic compounds, taking advantage of the chemical versatility of a triple bond.

Alkyne metathesis has been extensively utilized in material science to produce polymers containing triple bonds. These functional materials can have unusual structures like linear zigzags or helically coiled conformations. Additionally, the conjugated polymers have potential applications in organic light-emitted diodes, organic photovoltaics, organic field-effect transistors, and optical and molecular sensors.

Two crucial steps of the classical mechanism of alkyne metathesis are shown in FIG. 1B and include a cycloaddition reaction between alkyne and metal alkylidyne (a complex containing M-C triple bond) to form metallacyclobutadiene (MCBD) followed by the cycloreversion step to form a new alkylidyne and alkyne product. Those steps resemble the mechanism of classical olefin metathesis.

However, unlike olefin metathesis, the number of alkyne metathesis catalytic systems is somewhat limited. Indeed, the currently used systems rely exclusively on second and third-row transition metal alkylidynes such as Mo, W, and Re. Those complexes have disadvantages, including increased cost, primarily due to the low abundance of second- and third-row transition metals. Further, some of those metals are toxic; therefore, contamination by the catalyst might be a significant problem in some industries, such as the food and cosmetics industries.

In contrast, first-row metals are more sustainable, significantly less expensive, and often less toxic. As a result, their use can decrease energy usage and waste generation, lower the environmental footprint, reduce the products' final cost, and make them more affordable for consumers. In addition, the unique electronic structure of those metals can offer an unusual reactivity that is not attainable with second and third-row transition metals.

However, a few challenges preclude the development of many first-row metal-catalyzed transformations, such as a relatively weak metal-carbon bond, a preference for high-spin complexes, and an easily attainable variety of oxidation states. Thus, further efforts are needed to overcome these challenges to develop alkyne metathesis systems mediated by first-row metals.

Among first-row transition metals (or 3d transition metals), high oxidation state vanadium (V) complexes play an essential role in numerous catalytic transformations, primarily oxidation reactions, in both industry and nature. The fundamental property that is responsible for this reactivity is an easily attainable variety of lower oxidation states for V. Other catalytic transformations, including olefin and alkyne polymerizations, catalyzed by V(+5) complexes are also thought to proceed via reduced V species. In contrast, the preservation of V in a high oxidation state during chemical transformations presents a challenge due to the oxidizing nature of V(+5). Studies on V-based olefin metathesis showed that the reduction of V is a primary degradation pathway for $d^0$ V alkylidene catalysts.

One strategy to stabilize a metal center in a high oxidation state is introducing a ligand that can form multiple bonds with a metal and participate in extensive π-donation. Indeed, V(+5) complexes that do not contain multiple bonds are scarce. $VCl_5$ decomposes above −10° C. $VF_5$ is a stable compound that readily reacts with $F_3P$=O to give $F_3V$=O and $PF_5$, highlighting the strength of the V=O bond. Oxo ligand (V=O) is the most common moiety for V(+5) complexes, and many of those compounds are commercially available. Other isoelectronic ligands have also been utilized (V=X, where X=NR, S, Se, Te) and usually introduced in reactions with corresponding V oxo starting materials. However, decreasing the bond order between V and the oxo ligand often results in a reduction of the metal center.

V(+5) complexes that do not contain oxo and related ligands are rare and usually prepared via oxidation of low valent counterparts. In fact, all reported V(+5) alkylidynes are based on/β-diketiminate (Nacnac) ligand and synthesized from $VCl_3$ utilizing the method discovered by the Mindiola group in 2004. Those complexes can react with terminal alkynes; however, instead of alkyne metathesis, the reaction leads to cyclic polyolefins due to the formation of low valent V species that is facilitated by the non-innocent nature of the Nacnac ligand. In addition, the key transformation in a six-step synthesis of (Nacnac)V≡C'Bu(OTf) is α-hydrogen abstraction initiated by oxidation of a V(+4) alkylidene complex (FIG. 2 top). All of the intermediates are paramagnetic, which hinders the development of alternative pathways and optimized conditions.

V(+5) alkylidynes present a significantly underdeveloped class of 3d Schrock carbynes that can be utilized in numerous transformations, including alkyne metathesis. However, no alternative pathways to V(+5) alkylidynes have been proposed in the last 20 years, highlighting the challenges of 3d carbyne chemistry. Thus, there is a need to develop methods for producing V(+5) alkylidynes, particularly, as catalysts in, for example, alkyne metathesis chemistry.

BRIEF SUMMARY OF THE INVENTION

The subject invention provides compounds/complexes and/or salts thereof, compositions comprising one or more such compounds/complexes and/or salts thereof, synthesis of the compounds/complexes, and methods of using such compounds/complexes and/or salts thereof as catalysts in, for example, alkyne metathesis.

In one embodiment, the present invention provides a vanadium alkylidyne complex or a salt thereof, the vanadium alkylidyne complex having a general formula of $V(\equiv C-R)X_nL_{4-n}$, wherein each X is independently an anionic ligand; each L is independently a neutral ligand; n is 1, 2 or 3; and R is alkyl, aryl or $-Si(R^a)_3$, wherein $R^a$ is selected from, for example, alkyl, substituted alkyl, aryl, and substituted aryl.

In certain embodiments, each X is independently selected from a silane based ligand, a siloxide based ligand, a phenoxide based ligand, an alkoxide based ligand, an alkylthio based ligand, an arylthiol based ligand, a thioalkoxide based ligand, a halide based ligand, and an iminato based ligand. In specific embodiments, two X together form a bidentate ligand when n is 2 or 3, or three X together form a tridentate ligand when n is 3.

In certain embodiments, each L is independently selected from a pyridine based ligand, a nitrile based ligand, an ether based ligand, a thioether based ligand, a phosphine based ligand, a N-heterocyclic carbene (NHC) based ligand, and a cyclic(alkyl)(amino)carbene (CAAC) based ligand. In specific embodiments, two L together form a bidentate ligand when n is 1 or 2, or three L together form a tridentate ligand when n is 1.

In specific embodiments, the present invention provides a vanadium alkylidyne complex, which is a neutral complex comprising two anionic ligands and two neutral ligands in addition to the V≡C—R group, wherein each of the two anionic ligands and the two neutral ligands can be a monodentate ligand, bidentate ligand or tridentate ligand, or two or three of the two anionic ligands and the two neutral ligands together form a bidentate ligand or a tridentate ligand. In preferred embodiments, the two neutral ligands together form a bidentate ligand selected from bipyridine ligands such as 4,4'-bis(tert-butyl)-2,2'-bipyridine (dtbbpy), and phenanthroline ligands.

In certain embodiments, the present invention provides a vanadium alkylidyne complex, which is a cationic complex comprising one anionic ligand and three neutral ligands in addition to the V≡C—R group, wherein each of the one anionic ligand and the three neutral ligands can be a monodentate ligand, bidentate ligand or tridentate ligand, or two or three of the one anionic ligand and the three neutral ligands together form a bidentate ligand or a tridentate ligand.

In certain embodiments, the present invention provides a vanadium alkylidyne complex, which is an anionic complex comprising three anionic ligand and one neutral ligand in addition to the V≡C—R group, wherein each of the three anionic ligands and the one neutral ligand can be a monodentate ligand, bidentate ligand or tridentate ligand, or two or three of the three anionic ligands and the one neutral ligand together form a bidentate ligand or a tridentate ligand.

In one embodiment, the subject invention provides a vanadium alkylidyne complex having a general formula of:

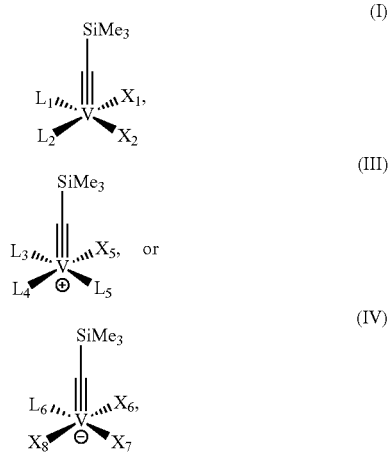

wherein $X_1$, $X_2$, $X_5$, $X_6$, $X_7$ and $X_8$ are each independently selected from halogens, silyl, alkylthio, arylthiol, alkoxides, thioalkoxides, siloxides, NCO, NCS, $NO_3$, and pyrrolides, or $X_1$ and $X_2$ together form a bidentate ligand, or two of $X_5$, $X_6$, $X_7$ and $X_8$ together form a bidentate ligand; and $L_1$, $L_2$, $L_3$, $L_4$, $L_5$ and $L_6$ are each independently selected from phosphines, NHCs, pyridines, nitriles, ethers, thioethers, CAACs and substituted versions thereof, or $L_1$ and $L_2$ together form a bidentate ligand, or two of $L_3$, $L_4$, and $L_5$ together form a bidentate ligand; or a salt thereof.

In one embodiment, the subject invention provides compositions comprising a vanadium alkylidyne complex of the subject invention or a salt thereof.

In one embodiment, the subject invention provides a novel method for synthesizing vanadium alkylidyne complexes through a three-step transformation that converts a vanadium oxo complex into a vanadium alkylidyne without altering the oxidation state of the metal center (FIG. 2 bottom). This transformation is facilitated by an anionic vanadium alkylidene intermediate, which allows for controlled reactivity and selective conversion to the desired alkylidyne complex.

The disclosed method provides a scalable and reproducible approach to synthesize vanadium alkylidyne catalysts. These catalysts demonstrate high efficiency in various metathesis reactions such as alkyne metathesis, enabling the production of various carbon-carbon triple bond-containing compounds, including conjugated functional materials with applications in, for example, electronic devices and sustainable materials.

In some embodiments, the present invention provides a method of synthesizing a vanadium alkylidyne complex, comprising steps of:
(1) mixing a vanadium oxo trialkoxyl complex with an alkylating agent to form a vanadium oxo trialkyl complex;
(2) treating the vanadium oxo trialkyl complex with an alkaline reagent in the presence of one or more neutral ligands (e.g., bipyridine ligand) to form an anionic vanadium alkylidene intermediate;
(3) mixing the anionic vanadium alkylidene intermediate with an electrophile; and optionally
(4) mixing the product of step (3) with an alcohol reagent or a phenol reagent.

The vanadium alkylidyne complexes as provided can serve as catalysts in various metathesis reactions. Thus, the present invention also provides a method of performing a metathesis reaction of at least one substrate, or two or more substrates in the presence of a catalytic component, in particular, the vanadium alkylidyne described and prepared herein, to produce an unsaturated compound, the method comprising contacting the at least one substrate, or two or more substrates with the catalytic component. In preferred embodiments, the vanadium alkylidyne complex described herein is the sole catalytic component used in the metathesis reaction.

In one embodiment, the subject invention provides a method for synthesizing an unsaturated compound via a metathesis reaction (e.g., alkyne metathesis), the method comprising contacting at least one, two or three substrates with the vanadium alkylidyne complex of the subject invention or the composition comprising the vanadium alkylidyne complex of the subject invention. In specific embodiments, the substrates are alkynes. The vanadium alkylidyne complex catalyzes a cross-metathesis reaction between the substrates or a polymerization of the at least one, two or three substrates.

DETAILED DESCRIPTION OF THE INVENTION

Figure 1:
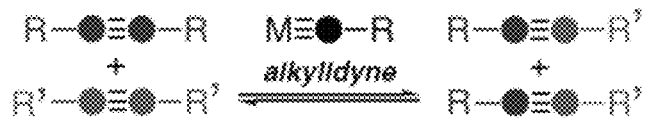
FIG. 1 shows alkyne metathesis and its mechanism.
Figure 1:
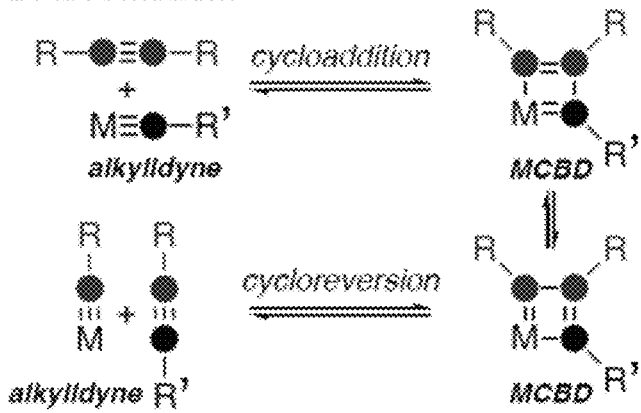
Figure 2:
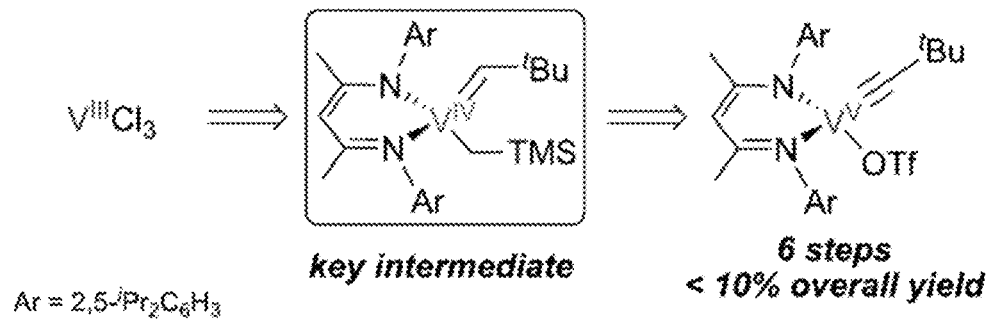
FIG. 2 shows a previous strategy (Mindiola 2004) and the current strategy (the present invention) for synthesis of V(+5) alkylidynes.
Figure 2:
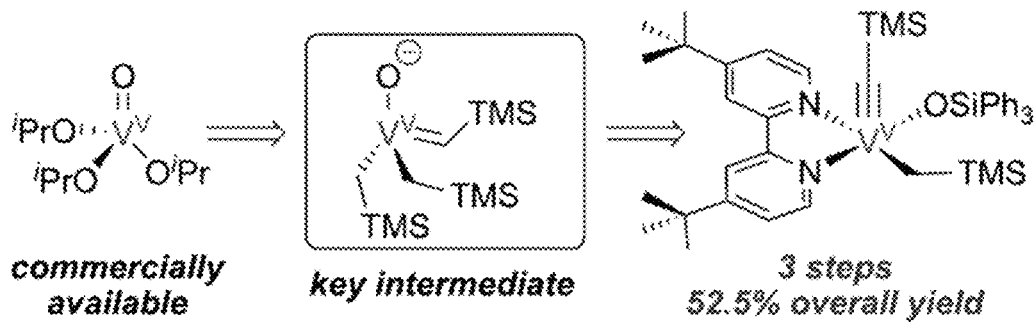

The subject invention provides catalytical compounds/complexes, and/or salts thereof, compositions comprising such compound/complex and/or salts thereof, synthesis of the compounds/complexes, and methods of using such compounds/complexes and/or salts thereof as catalysts in, for example, industrial processes producing chemicals employed in daily life, including plastics, advanced functional materials, household chemicals, agricultural compounds, pharmaceuticals, and many others.

In certain embodiments, the subject invention provides catalytical compounds/complexes having a meter center of one of the Earth-abundant first-row metals, such as vanadium (V), titanium (Ti), chromium (Cr), manganese (Mn), iron (Fe), cobalt (Co), nickel (Ni), and copper (Cu).

The present invention provides a unique transformation involving anionic V(+5) alkylidene that converts a V(+5) oxo complex to a V(+5) alkylidyne in three steps without altering the oxidation state of the metal center. This method can be used to obtain rare 3d Schrock carbynes, which provide easy and scalable access to V(+5) alkylidynes. Those alkylidyne complexes can be utilized to mediate alkyne metathesis.

Alkyne metathesis is a synthetic method for the synthesis of chemicals containing carbon-carbon triple bonds, including advanced materials that have potential applications in organic light-emitted diodes, organic photovoltaics, organic field-effect transistors, and optical and molecular sensors. The reversible nature of alkyne metathesis allows for the chemical recycling of resulting materials. In addition, alkynes are essential starting points for producing a large variety of organic compounds, taking advantage of the chemical versatility of a triple bond.

Advantageously, the use of Earth-abundant first-row metal, such as vanadium, have an exceptionally broad impact on society by providing less expensive, greener, and energy-efficient alternatives. This, in turn, makes essential chemicals more accessible to consumers and decreases the human environmental footprint. Thus, first-row metal catalysts can offer a unique reactivity compared to second- and third-row counterparts.

In certain embodiments, the subject invention provides a composition comprising a compound/complex having a metal center selected from first-row metals. In preferred embodiments, the composition of the subject invention further comprises a carrier, diluent, or excipient with which the compound/complex can be formulated or dissolved.

In one embodiment, the subject invention provides a composition comprising the vanadium alkylidyne compound/complex of the subject invention. In one embodiment, the composition further comprises a carrier, diluent, or excipient with which the vanadium alkylidyne compound/complex can be formulated or dissolved. The carriers, diluents or excipients may include, for example, aqueous vehicles, non-aqueous vehicles, stabilizers, and solubility enhancers. In a specific embodiment, the carrier, diluent or excipient may be a solvent, e.g., an organic solvent such as toluene, pentane, or ether.

In certain embodiments, the vanadium alkylidyne compound/complex of the subject invention is in a solid form or a liquid form when dissolved in a solvent. In specific embodiments, the solvent is selected from, for example, $CDCl_3$, $CD_2Cl_2$, $C_6D_6$, toluene, $C_6H_5F$, THF, ether, DME, and pentane.

In one embodiment, the subject invention provides a kit comprising the vanadium alkylidyne complex of the subject invention. The kit may further comprise a solvent, a container, and an instruction for use the vanadium alkylidyne complex.

Vanadium Alkylidyne Complexes

The subject invention provides a novel class of 3d Schrock carbyne, specifically a series of high oxidation state vanadium alkylidynes. In one embodiment, the present invention provides a vanadium alkylidyne complex having a general formula of V(≡C—R)$X_nL_{4-n}$, wherein X is an anionic ligand; L is a neutral ligand; n is 1, 2 or 3; and R is alkyl, aryl or —Si(R$^a$)$_3$, wherein R$^a$ is selected from, for example, alkyl, substituted alkyl, aryl, and substituted aryl. In a specific embodiment, R is SiMe$_3$.

In certain embodiments, each X is independently selected from, for example, a silane based ligand, a siloxide based ligand, a phenoxide based ligand, an alkoxide based ligand, a thioalkoxide based ligand, a halide based ligand, and an iminato based ligand. In specific embodiments, each X is independently selected from, for example, halogens, alkoxides, thioalkoxides, siloxides, NCO, NCS, NO₃, and pyrrolides.

In certain embodiments, each L is independently selected from a pyridine based ligand, a nitrile based ligand, an ether based ligand, a thioether based ligand, a phosphine (such as trialkyl phosphine) based ligand, a saturated and unsaturated N-heterocyclic carbene (NHC) based ligand, and a cyclic (alkyl)(amino)carbene (CAAC) based ligand. In specific embodiments, each L is independently selected from, for example, phosphines, NHCs, pyridines, nitriles, ethers, thioethers, CAACs and substituted thereof.

In certain embodiments, each of X and L can be a monodentate ligand, or two or three of X and L together form a bidentate ligand or a tridentate ligand.

Generally, the nature of the alkylidyne group ≡C—R has a modest influence on the catalytic performance because it exchanges during the catalytic cycle. However, it is important for applications where the initiation step is crucial, such as ring-opening alkyne metathesis polymerization. In those cases, the right balance between the electronic and steric properties of the alkylidyne group is essential to ensure that the rate of initiation is higher than the rate of propagation to prevent undesired intra- and intermolecular chain-transfer processes and to obtain polymers with a narrow molecular weight distribution.

By optimizing the ligand set around the Vanadium center, the vanadium alkylidynes provided by the present invention function as robust and reliable catalysts in, for example, alkyne cross-metathesis, ring-closing alkyne metathesis, ring-opening alkyne metathesis polymerization, and other related reactions.

In one embodiment, the subject invention provides a vanadium alkylidyne complex having a structure of:

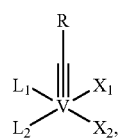

wherein $L_1$ and $L_2$ are neutral ligands; $X_1$ and $X_2$ are anionic ligands; and R is alkyl, aryl or —Si(R$^a$)₃, wherein R$^a$ is selected from, for example, alkyl, substituted alkyl, aryl, and substituted aryl. In a specific embodiment, R is SiMe₃. In certain embodiments, each of $X_1$, $X_2$, $L_1$ and $L_2$ is a monodentate ligand, or two or three of $X_1$, $X_2$, $L_1$ and $L_2$ together form a bidentate ligand or a tridentate ligand.

In a specific embodiment, one of $X_1$, $X_2$, $L_1$ and $L_2$ can be absent.

In certain embodiments, each of $X_1$ and $X_2$ is independently selected from, for example, a silane based ligand, a siloxide based ligand, a phenoxide based ligand, an alkoxide based ligand, an alkylthio based ligand, an arylthiol based ligand, a thioalkoxide based ligand, a halide based ligand, and an iminato based ligand. In certain embodiments, $X_1$ and $X_2$ are each independently selected from, for example, halogens, alkoxides, silyl, alkylthio, arylthiol, thioalkoxides, siloxides, NCO, NCS, NO₃, and pyrrolides.

In preferred embodiments, $X_1$ and $X_2$ are each independently selected from, for example, —CH₂SiMe₃, —OPh, —SPh, —OSiPh₃, —OSiMePh₂, —OSi(p-MeOC₆H₄)₃, —OSiMe₂Ph, o-MeOC₆H₄O—, m-MeOC₆H₄O—, p-MeOC₆H₄O—, o-MeOC₆H₄S—, m-MeOC₆H₄S—, p-MeOC₆H₄S—, 2,6-(MeO)₂C₆H₃O—, 2,5-(MeO)₂C₆H₃O—, 2,4-(MeO)₂C₆H₃O—, 2,3-(MeO)₂C₆H₃O—, 3,4-(MeO)₂C₆H₃O—, 3,5-(MeO)₂C₆H₃O—, —OC(CF₃)₃, —OCPh(CF₃)₂, —OCMe(CF₃)₂, —OCMe₂CF₃, —OCMe₃, —OAd, —OBu$^t$F₆, —OC₆F₅, —OTf, pyrrolyl, —I, —F, —Cl, —Br, NO₃, and

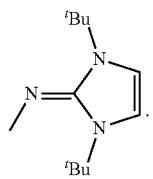

In specific embodiments, $X_1$ and $X_2$ together form a bidentate ligand, such as 1,1'-bi-2-naphthol (BINOL) ligand.

In certain embodiments, each of $L_1$ and $L_2$ is independently selected from, for example, a pyridine based ligand, a nitrile based ligand, an ether based ligand, a thioether based ligand, a phosphine (such as trialkyl phosphine) based ligand, a saturated and unsaturated N-heterocyclic carbene (NHC) based ligand, and a cyclic(alkyl)(amino)carbene (CAAC) based ligand. In preferred embodiments, $L_1$ and $L_2$ are each independently selected from, for example, phosphines, NHCs, pyridines, nitriles, ethers, thioethers, CAACs and substituted thereof.

In specific embodiments, $L_1$ and $L_2$ are each independently phosphines having a general structure of P(R₁)(R₂)(R₃), where R₁, R₂, and R₃ are each independently selected from hydrogen, alkyl, substituted alkyl, aryl and substituted aryl.

In some embodiments, $L_1$ and $L_2$ are each independently NHCs, e.g., saturated or unsaturated NHCs. In a specific embodiment, the NHC is

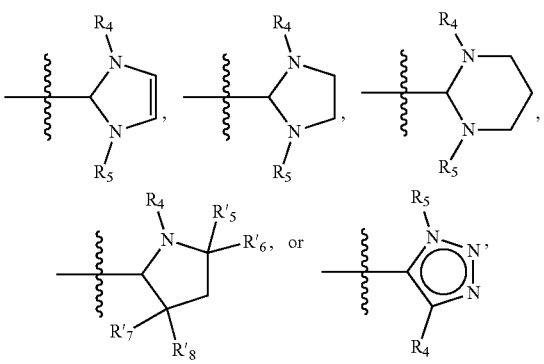

wherein R₄, R₅, R₆', R₇' and R₈' are independently selected from hydrogen, alkyl, substituted alkyl, cycloalkyl, substituted cycloalkyl, aryl, and substituted aryl.

In certain embodiments, $L_1$ and $L_2$ are each independently pyridines having a structure of

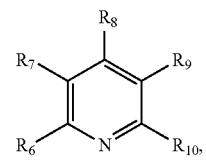

wherein $R_6$, $R_7$, $R_8$, $R_9$, $R_{10}$ are each independently selected from, for example, hydrogen, halogens, alkyl, substituted alkyl, hydorxyl, acyl, and —$NH_2$.

In certain embodiments, $L_1$ and $L_2$ are each independently nitriles selected from, for example,

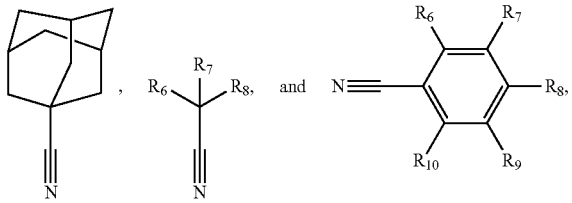

wherein $R_6$, $R_7$, $R_8$, $R_9$, $R_{10}$ are each independently selected from hydrogen, halogens, alkyl, substituted alkyl, alkoxides, aryl, substituted aryl, hydorxyl, acyl, and —$NH_2$.

In a specific embodiment, each of $L_1$ and $L_2$ is independently selected from, for example, —$PMe_3$, —$PEt_3$, —$NC_5H_5$, —$NC_5H_4Br$, —N≡C—$CMe_3$,

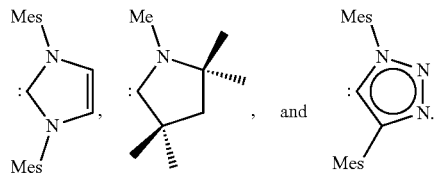

In one embodiment, the present invention provides a vanadium alkylidyne complex, which is a neutral complex containing two anionic ligands and two neutral ligands in addition to the V≡C—R group, having a general formula of:

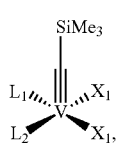
(I)

wherein each of $X_1$ and $X_2$ is an anionic ligand, and each of $L_1$ and $L_2$ is a neutral ligand. In a specific embodiment, one of $X_1$, $X_2$, $L_1$ and $L_2$ can be absent.

In formula (I), each of $X_1$, $X_2$, $L_1$ and $L_2$ can be a monodentate ligand, or two or three of $X_1$, $X_2$, $L_1$ and $L_2$ together form a bidentate ligand or a tridentate ligand.

In certain embodiments, each of $X_1$ and $X_2$ is independently selected from, for example, a silane based ligand, a siloxide based ligand, a phenoxide based ligand, an alkoxide based ligand, an alkylthio based ligand, an arylthiol based ligand, a thioalkoxide based ligand, a halide based ligand, and an iminato based ligand. In certain embodiments, $X_1$ and $X_2$ are each independently selected from, for example, halogens, silyl, alkylthio, arylthiol, alkoxides, thioalkoxides, siloxides, NCO, NCS, $NO_3$, and pyrrolides.

In preferred embodiments, $X_1$ and $X_2$ are each independently selected from, for example, —$CH_2SiMe_3$, —OPh, —SPh, —$OSiPh_3$, —$OSiMePh_2$, —$OSi(p-MeOC_6H_4)_3$, —$OSiMe_2Ph$, o-$MeOC_6H_4O$—, m-$MeOC_6H_4O$—, p-$MeOC_6H_4O$—, o-$MeOC_6H_4S$—, m-$MeOC_6H_4S$—, p-$MeOC_6H_4S$—, 2,6-$(MeO)_2C_6H_3O$—, 2,5-$(MeO)_2C_6H_3O$—, 2,4-$(MeO)_2C_6H_3O$—, 2,3-$(MeO)_2C_6H_3O$—, 3,4-$(MeO)_2C_6H_3O$—, 3,5-$(MeO)_2C_6H_3O$—, —$OC(CF_3)_3$, —$OCPh(CF_3)_2$, —$OCMe(CF_3)_2$, —$OCMe_2CF_3$, —$OCMe_3$, —OAd, —$OBu^tF_6$, —$OC_6F_5$, —OTf, pyrrolyl, —I, —F, —Cl, —Br, $NO_3$, and

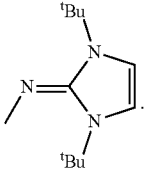

In certain embodiments, each of $L_1$ and $L_2$ is independently selected from a pyridine based ligand, a nitrile based ligand, an ether based ligand, a thioether based ligand, a phosphine (such as trialkyl phosphine) based ligand, a saturated and unsaturated N-heterocyclic carbene (NHC) based ligand, and a cyclic(alkyl)(amino)carbene (CAAC) based ligand. Preferably, each of $L_1$ and $L_2$ is independently selected from —$PMe_3$, —$PEt_3$, —$NC_5H_5$, —$NC_5H_4Br$, —N≡C—$CMe_3$,

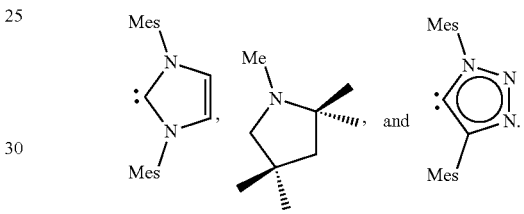

In certain embodiments, $L_1$ and $L_2$ together form a bidentate ligand selected from, for example, bipyridine ligands such as 4,4'-bis(tert-butyl)-2,2'-bipyridine (dtbbpy), and phenanthroline ligands.

In some embodiments, the anionic ligand and the neutral ligand in the vanadium alkylidyne can be monodentate or polydentate (such as bidentate or tridentate) ligands. In certain embodiments, the vanadium alkylidyne provided by the subject invention contains substituted 2,2'-bipyridine (dtbbpy) as a neutral ligand, wherein the dtbbpy ligand can be used to stabilize intermediates in the synthesis of the vanadium alkylidyne.

In certain embodiments, the vanadium alkylidyne complex provided by the subject invention contains two identical neutral ligands. In certain embodiments, the vanadium alkylidyne complex provided by the subject invention is a non-symmetrical vanadium alkylidyne that contains two types of neutral ligands: 1) strong σ-donating neutral ligands, such as trialkyl phosphines, saturated and unsaturated N-heterocyclic carbenes (NHCs), and cyclic(alkyl)(amino)carbenes (CAACs) to ensure that those ligands will be coordinated to electrophilic V center during the catalysis; and 2) weakly coordinated neutral ligands, such as pyridines, nitriles, and ethers to facilitate the initiation step and open up the coordination site for incoming alkyne. The Tolman Electronic parameter (TEP) and "buried volume" parameter (% $V_{bur}$) can be used to identify neutral ligands that can coordinate to each specific V complex depending on present alkylidyne and anionic ligands.

Representative vanadium alkylidynes provided by the subject invention include, but are not limited to, those shown in formulas (Ia)-(Ic).

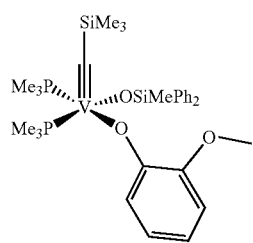

(Ia)

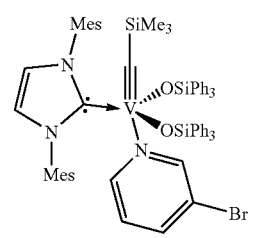

(Ib)

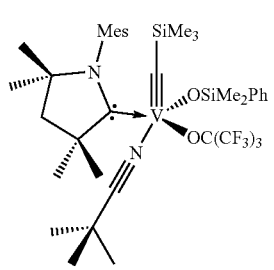

(Ic)

The use of pyridine as a labile ligand that readily dissociates during the initiation step is an attractive method for preparing active catalysts. The variation of pyridine substituents can easily control the binding constant of pyridine derivatives. Furthermore, pyridine is a relatively small ligand. Thus, the % $V_{bur}$ of parent pyridine is only 20.6 (2.0 Å), which is significantly smaller than PMe$_3$ (26.1, 2.0 Å). As a result, pyridine-containing alkylidenes can accommodate larger NHC or anionic ligands X than phosphine-containing counterparts.

Another attractive class of neutral labile ligands is nitriles as nitrile-containing precatalysts exhibit higher initiation rates than analogous complexes containing pyridine. In certain embodiments, the vanadium alkylidyne provided by the subject invention contains bulky or electron-deficient nitriles to avoid possible [2+2]cycloaddition between an alkylidyne and a nitrile. In certain embodiments, the vanadium alkylidyne provided by the subject invention contains ether- and thioether-based ligands for facilitating the initiation step.

Figures 3A, 3B:
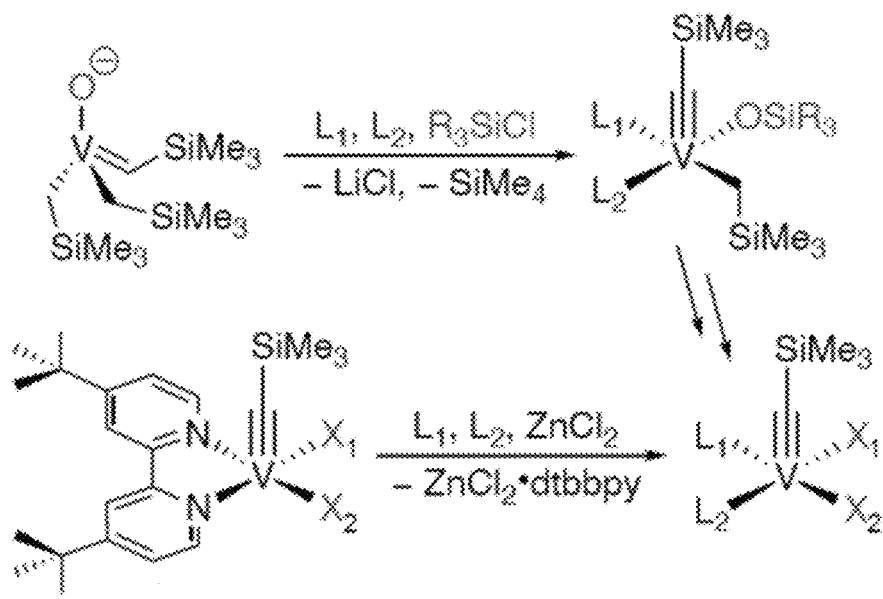
FIGS. 3A-3B show strategies for synthesis of V alkylidynes (3A); and electronic and steric properties of anionic ligands (3B).

In some embodiments, the vanadium alkylidyne complex provided by the subject invention can be synthesized using two strategies shown in FIG. 3A: 1) α-hydrogen abstraction in the reaction between anionic alkylidene and silyl chlorides in the presence of corresponding neutral ligands (FIG. 3A, top); 2) ligand exchange reaction between dtbbpy complexes and corresponding neutral ligands in the presence of ZnCl$_2$ (FIG. 3A, bottom).

The choice of anionic ligand(s) is an important part of the vanadium alkylidyne that affects its activity, selectivity, and stability. To achieve high catalytic performance of vanadium alkylidynes, the right balance of electronic properties is required for efficient catalysis. Because the electronegativity of V is lower compared to Mo/W, the proper ligand set is needed for vanadium alkylidyne catalysts to temper its Lewis acidity.

In some embodiments, the anionic ligands with weak to moderate electron-withdrawing abilities can be beneficial. Suitable ligands may be selected based on the ligand donor parameter (LDP) (electronic properties) and/or % $V_{bur}$ (steric properties) in order to achieve an optimal ligand set around V for alkyne metathesis (FIG. 3B). For example, steric properties of the anionic ligands should be assessed to ensure that they provide sufficient protection towards bimolecular decomposition and do not block the coordination site around V for the incoming alkyne. In certain embodiments, the anionic ligands include siloxides, halides, alkoxides, thioalkoxides, and iminato-based ligands. The right balance between electronic and steric properties of neutral and anionic ligands is preferred to destabilize the MCBD for efficient alkyne metathesis.

Representative vanadium alkylidynes provided by the subject invention further include, but are not limited to, those shown in formulas (Id)-(Ig):

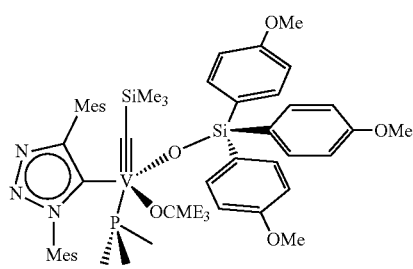

(Id)

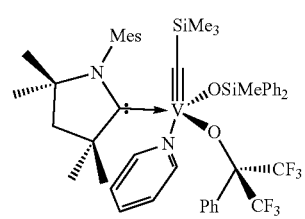

(Ie)

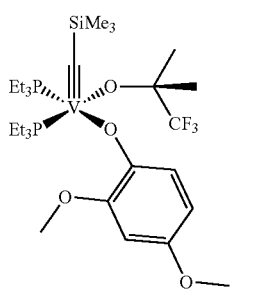

(If)

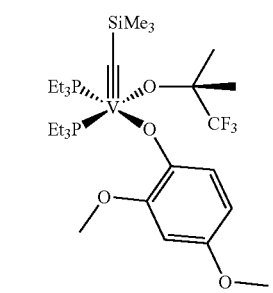

(Ig)

In some embodiments, these vanadium alkylidyne complexes can be synthesized using corresponding silyl chlorides to introduce the siloxide groups and protonation of the alkyl group by corresponding acid (HX). The siloxide group can also be replaced by the protonation reaction. In certain embodiments, salt metathesis can be utilized for the anionic ligand exchange.

In some embodiments, the present invention provides a vanadium alkylidyne complex having a general formula of:

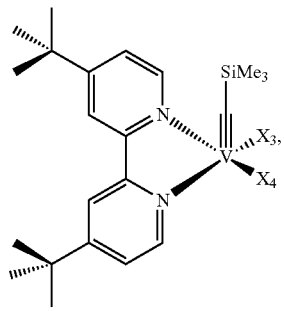

(II)

wherein each of $X_3$ and $X_4$ is an anionic ligand.

In specific embodiments, in formula (II), each of $X_3$ and $X_4$ can be a monodentate ligand, or $X_3$ and $X_4$ together form a bidentate ligand.

In certain embodiments, each of $X_3$ and $X_4$ is independently selected from, for example, a silane based ligand, a siloxide based ligand, a phenoxide based ligand, an alkoxide based ligand, an alkylthio based ligand, an arylthiol based ligand, a thioalkoxide based ligand, a halide based ligand, and an iminato based ligand. In certain embodiments, $X_3$ and $X_4$ are each independently selected from, for example, halogens, silyl, alkylthio, arylthiol, aikoxides, thioaikoxides, siloxides, NCO, NCS, $NO_3$, and pyrrolides.

In preferred embodiments, each of $X_3$ and $X_4$ is independently selected from —$CH_2SiMe_3$, —OPh, —SPh, —$OSiPh_3$, —$OSiMePh_2$, —$OSi(p-MeOC_6H_4)_3$, —$OSiMe_2Ph$, o-$MeOC_6H_4O$—, m-$MeOC_6H_4O$—, p-$MeOC_6H_4O$—, o-$MeOC_6H_4S$—, m-$MeOC_6H_4S$—, p-$MeOC_6H_4S$—, 2,6-$(MeO)_2C_6H_3O$—, 2,5-$(MeO)_2C_6H_3O$—, 2,4-$(MeO)_2C_6H_3O$—, 2,3-$(MeO)_2C_6H_3O$—, 3,4-$(MeO)_2C_6H_3O$—, 3,5-$(MeO)_2C_6H_3O$—, —$OC(CF_3)_3$, —$OCPh(CF_3)_2$, —$OCMe(CF_3)_2$, —$OCMe_2CF_3$, —$OCMe_3$, —OAd, —$OBu^tF_6$, —$OC_6F_5$, —OTf, $NO_3$, pyrrolyl, —I, —F, —Cl, —Br, and

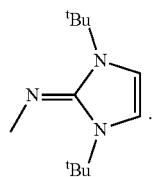

In certain embodiments, $X_3$ and $X_4$ together form a bidentate ligand, such as 1,1'-bi-2-naphthol (BINOL) ligand.

Representative vanadium alkylidynes provided by the subject invention further include, but are not limited to, those shown in formulas (IIa)-(IIc):

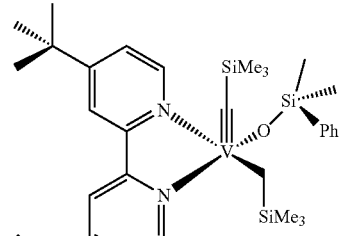

(IIa)

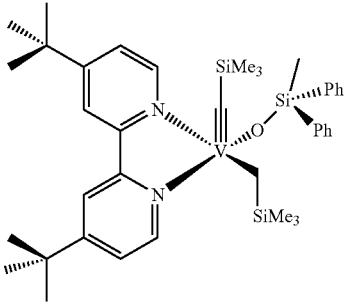

(IIb)

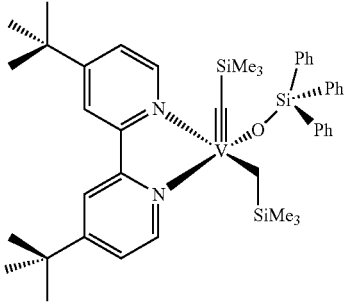

(IIc)

In some embodiments, the present invention provides a vanadium alkylidyne complex, which is a cationic complex comprising one anionic ligand and three neutral ligands in addition to the V≡C—R group, wherein the vanadium alkylidyne complex has a structure of:

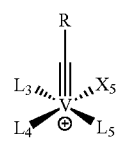

wherein $L_3$, $L_4$ and $L_5$ are neutral ligands, and optionally, one of $L_3$, $L_4$ and $L_5$ can be absent; $X_5$ is an anionic ligand; and R is alkyl, aryl or —$Si(R^a)_3$, wherein $R^a$ is selected from, for example, alkyl, substituted alkyl, aryl, and substituted aryl. In a specific embodiment, R is $SiMe_3$. In certain embodiments, each of $X_5$, $L_3$, $L_4$ and $L_5$ is a monodentate ligand, or two or three of $X_5$, $L_3$, $L_4$ and $L_5$ together form a bidentate ligand or a tridentate ligand.

In certain embodiments, $X_5$ is selected from, for example, a silane based ligand, a siloxide based ligand, a phenoxide based ligand, an alkoxide based ligand, an alkylthio based ligand, an arylthiol based ligand, a thioalkoxide based ligand, a halide based ligand, and an iminato based ligand.

In certain embodiments, $X_5$ is selected from, for example, halogens, silyl, alkylthio, arylthiol, alkoxides, thioalkoxides, siloxides, NCO, NCS, $NO_3$, and pyrrolides.

In preferred embodiments, $X_5$ is selected from, for example, —$CH_2SiMe_3$, —OPh, —SPh, —$OSiPh_3$, —$OSiMePh_2$, —$OSi(p\text{-}MeOC_6H_4)_3$, —$OSiMe_2Ph$, o-$MeOC_6H_4O$—, m-$MeOC_6H_4O$—, p-$MeOC_6H_4O$—, o-$MeOC_6H_4S$—, m-$MeOC_6H_4S$—, p-$MeOC_6H_4S$—, 2,6-$(MeO)_2C_6H_3O$—, 2,5-$(MeO)_2C_6H_3O$—, 2,4-$(MeO)_2C_6H_3O$—, 2,3-$(MeO)_2C_6H_3O$—, 3,4-$(MeO)_2C_6H_3O$—, 3,5-$(MeO)_2C_6H_3O$—, —$OC(CF_3)_3$, —$OCPh(CF_3)_2$, —$OCMe(CF_3)_2$, —$OCMe_2CF_3$, —$OCMe_3$, —OAd, —$OBu^fF_6$, —$OC_6F_5$, —OTf, pyrrolyl, —I, —F, —Cl, —Br, $NO_3$, and

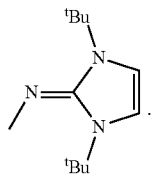

In certain embodiments, each of $L_3$, $L_4$, and $L_5$ is independently selected from, for example, a pyridine based ligand, a nitrile based ligand, an ether based ligand, a thioether based ligand, a phosphine (such as trialkyl phosphine) based ligand, a saturated and unsaturated N-heterocyclic carbene (NHC) based ligand, and a cyclic(alkyl)(amino)carbene (CAAC) based ligand. In preferred embodiments, $L_3$, $L_4$, and $L_5$ are each independently selected from, for example, phosphines, NHCs, pyridines, nitriles, ethers, thioethers, CAACs and substituted thereof.

In specific embodiments, phosphines have a general structure of $P(R_1)(R_2)(R_3)$, where $R_1$, $R_2$, and $R_3$ are each independently selected from hydrogen, alkyl, substituted alkyl, aryl and substituted aryl.

In specific embodiments, the NHC is

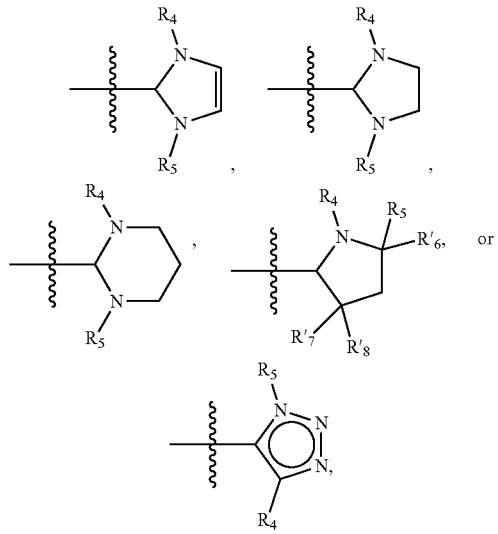

wherein $R_4$, $R_5$, $R_6'$, $R_7'$ and $R_8'$ are independently selected from hydrogen, alkyl, substituted alkyl, cycloalkyl, substituted cycloalkyl, aryl, and substituted aryl.

In certain embodiments, pyridines have a structure of

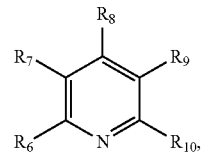

wherein $R_6$, $R_7$, $R_8$, $R_9$, $R_{10}$ are each independently selected from, for example, hydrogen, halogens, alkyl, substituted alkyl, hydorxyl, acyl, and —$NH_2$.

In certain embodiments, nitriles are selected from, for example,

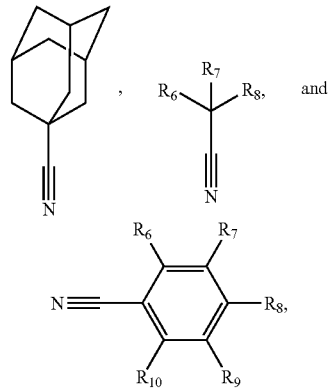

wherein $R_6$, $R_7$, $R_8$, $R_9$, $R_{10}$ are each independently selected from hydrogen, halogens, alkyl, substituted alkyl, alkoxides, aryl, substituted aryl, hydorxyl, acyl, and —$NH_2$.

In a specific embodiment, each of $L_3$, $L_4$ and $L_5$ is independently selected from, for example, —$PMe_3$, —$PEt_3$, —$NC_5H_5$, —$NC_5H_4Br$, —N≡C—$CMe_3$, $Me_3$,

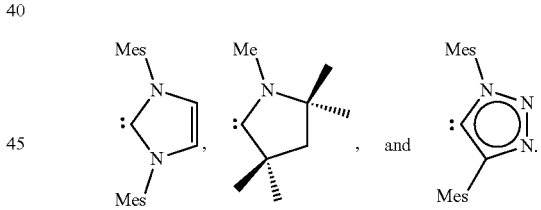

In some embodiments, the present invention provides a cationic vanadium alkylidyne complex having a general formula of:

(III)

wherein $X_5$ is an anionic ligand, and each of $L_3$, $L_4$ and $L_5$ is a neutral ligand, and wherein $X_5$ is selected from a silane based ligand, a siloxide based ligand, a phenoxide based ligand, an alkoxide based ligand, an alkylthio based ligand, an arylthiol based ligand, a thioalkoxide based ligand, a halide based ligand, and an iminato based ligand. Preferably, $X_5$ is selected from —CH₂SiMe₃, —OPh, —SPh, —OSiPh₃, —OSiMePh₂, —OSi(p-MeOC₆H₄)₃, —OSiMe₂Ph, o-MeOC₆H₄O—, m-MeOC₆H₄O—, p-MeOC₆H₄O—, o-MeOC₆H₄S—, m-MeOC₆H₄S—, p-MeOC₆H₄S—, 2,6-(MeO)₂C₆H₃O—, 2,5-(MeO)₂C₆H₃O—, 2,4-(MeO)₂C₆H₃O—, 2,3-(MeO)₂C₆H₃O—, 3,4-(MeO)₂C₆H₃O—, 3,5-(MeO)₂C₆H₃O—, —OC(CF₃)₃, —OCPh(CF₃)₂, —OCMe(CF₃)₂, —OCMe₂CF₃, —OCMe₃, —OAd, —OBuᶠF₆, —OC₆F₅, —OTf, pyrrolyl, —I, —F, —Cl, —Br, NO₃, and

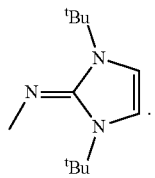

In certain embodiments, each of $L_3$, $L_4$ and $L_5$ is independently selected from a pyridine based ligand, a nitrile based ligand, an ether based ligand, a thioether based ligand, a phosphine (such as trialkyl phosphine) based ligand, a saturated and unsaturated N-heterocyclic carbene (NHC) based ligand, and a cyclic(alkyl)(amino)carbene (CAAC) based ligand. Preferably, each of $L_3$, $L_4$ and $L_5$ is independently selected from —PMe₃, —PEt₃, —NC₅H₅, —NC₅H₄Br, —N≡C—CMe₃,

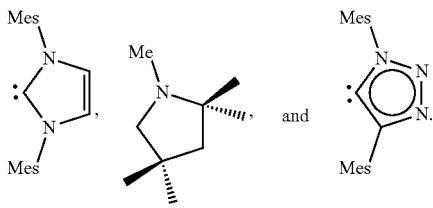

In certain embodiments, two of $L_3$, $L_4$ and $L_5$ together form a bidentate ligand selected from bipyridine ligand such as 4,4'-bis(tert-butyl)-2,2'-bipyridine (dtbbpy), and phenanthroline ligand.

In a specific embodiment, one of $L_3$, $L_4$ and $L_5$ can be absent.

Representative vanadium alkylidyne cationic complexes provided by the subject invention include, but are not limited to, those shown in formulas (IIIa)-(IIId) (anions are not shown for simplicity).

(IIIa)
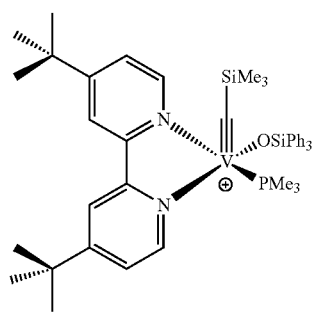

(IIIb)
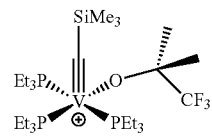

(IIIc)
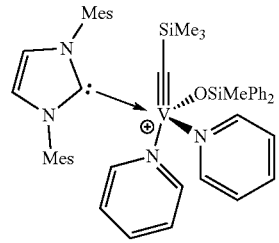

(IIId)
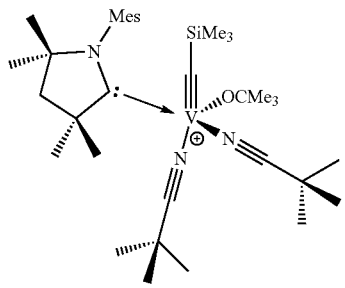

In some embodiments, these vanadium alkylidyne cationic complexes can be synthesized from the corresponding vanadium alkylidyne neutral complexes V(≡CR)X₂L₂ by utilizing Brookhart's acid or NaBArF to replace one anionic ligand X with one neutral ligand L.

In some embodiments, the present invention provides a vanadium alkylidyne complex, which is an anionic complex containing three anionic ligands and one neutral ligand, wherein the anionic vanadium alkylidyne complex has a structure of:

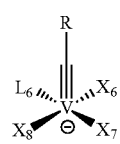

wherein $L_6$ is a neutral ligand; $X_6$, $X_7$, and $X_8$ are anionic ligands; and R is alkyl, aryl or —Si(Rᵃ)₃, wherein Rᵃ is selected from, for example, alkyl, substituted alkyl, aryl, and substituted aryl. In a specific embodiment, R is SiMe₃. In certain embodiments, each of $X_6$, $X_7$, $X_8$ and $L_6$ is a monodentate ligand, or two or three of $X_6$, $X_7$, $X_8$ and $L_6$ together form a bidentate ligand or a tridentate ligand. In specific embodiments, two of $X_6$, $X_7$ and $X_8$ together (e.g., $X_6$ and $X_7$, and $X_7$ and $X_8$) form a bidentate ligand, such as 1,1'-bi-2-naphthol (BINOL) ligand.

In certain embodiments, each of $X_6$, $X_7$, and $X_8$ is independently selected from, for example, a silane based ligand, a siloxide based ligand, a phenoxide based ligand, an alkoxide based ligand, an alkylthio based ligand, an arylthiol based ligand, a thioalkoxide based ligand, a halide based ligand, and an iminato based ligand. In certain embodiments, $X_6$, $X_7$, and $X_8$ are each independently selected from, for example, halogens, silyl, alkylthio, arylthiol, alkoxides, thioalkoxides, siloxides, NCO, NCS, $NO_3$, and pyrrolides.

In preferred embodiments, $X_6$, $X_7$, and $X_8$ are each independently selected from, for example, —$CH_2SiMe_3$, —OPh, —SPh, —$OSiPh_3$, —$OSiMePh_2$, —OSi(p-MeOC$_6$H$_4$)$_3$, —$OSiMe_2Ph$, o-MeOC$_6$H$_4$O—, m-MeOC$_6$H$_4$O—, p-MeOC$_6$H$_4$O—, o-MeOC$_6$H$_4$S—, m-MeOC$_6$H$_4$S—, p-MeOC$_6$H$_4$S—, 2,6-(MeO)$_2$C$_6$H$_3$O—, 2,5-(MeO)$_2$C$_6$H$_3$O—, 2,4-(MeO)$_2$C$_6$H$_3$O—, 2,3-(MeO)$_2$C$_6$H$_3$O—, 3,4-(MeO)$_2$C$_6$H$_3$O—, 3,5-(MeO)$_2$C$_6$H$_3$O—, —OC(CF$_3$)$_3$, —OCPh(CF$_3$)$_2$, —OCMe(CF$_3$)$_2$, —OCMe$_2$CF$_3$, —OCMe$_3$, —OAd, —OBu$^t$F$_6$, —OC$_6$F$_5$, —OTf, pyrrolyl, —I, —F, —Cl, —Br, $NO_3$, and

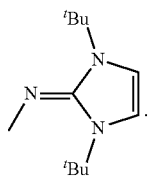

In certain embodiments, $L_6$ is selected from, for example, a pyridine based ligand, a nitrile based ligand, an ether based ligand, a thioether based ligand, a phosphine (such as trialkyl phosphine) based ligand, a saturated and unsaturated N-heterocyclic carbene (NHC) based ligand, and a cyclic (alkyl)(amino)carbene (CAAC) based ligand. In preferred embodiments, $L_6$ is selected from, for example, phosphines, NHCs, pyridines, nitriles, ethers, thioethers, CAACs and substituted thereof.

In some embodiments, the present invention provides an anionic vanadium alkylidyne complex having a general formula of:

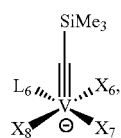

(IV)

wherein each of $X_6$, $X_7$ and $X_8$ is an anionic ligand, and $L_6$ is a neutral ligand; wherein each of $X_6$, $X_7$ and $X_8$ is independently selected from a silane based ligand, a siloxide based ligand, a phenoxide based ligand, an alkoxide based ligand, an alkylthio based ligand, an arylthiol based ligand, a thioalkoxide based ligand, a halide based ligand, and an iminato based ligand. Preferably, each of $X_6$, $X_7$ and $X_8$ is independently selected from —$CH_2SiMe_3$, —OPh, —SPh, —$OSiPh_3$, —$OSiMePh_2$, —OSi(p-MeOC$_6$H$_4$)$_3$, —$OSiMe_2Ph$, o-MeOC$_6$H$_4$O—, m-MeOC$_6$H$_4$O—, p-MeOC$_6$H$_4$O—, o-MeOC$_6$H$_4$S—, m-MeOC$_6$H$_4$S—, p-MeOC$_6$H$_4$S—, 2,6-(MeO)$_2$C$_6$H$_3$O—, 2,5-(MeO)$_2$C$_6$H$_3$O—, 2,4-(MeO)$_2$C$_6$H$_3$O—, 2,3-(MeO)$_2$C$_6$H$_3$O—, 3,4-(MeO)$_2$C$_6$H$_3$O—, 3,5-(MeO)$_2$C$_6$H$_3$O—, —OC(CF$_3$)$_3$, —OCPh(CF$_3$)$_2$, —OCMe(CF$_3$)$_2$, —OCMe$_2$CF$_3$, —OCMe$_3$, —OAd, —OBu$^t$F$_6$, —OC$_6$F$_5$, —OTf, pyrrolyl, —I, —F, —Cl, —Br, $NO_3$, and

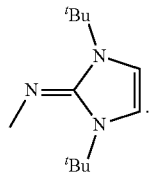

In formula (IV), each of $X_6$, $X_7$, $X_8$ and $L_6$ can be a monodentate ligand, or two or three of $X_6$, $X_7$, $X_8$ and $L_6$ together form a bidentate ligand or a tridentate ligand. In certain embodiments, two of $X_6$, $X_7$ and $X_8$ together form a bidentate ligand, such as 1,1'-bi-2-naphthol (BINOL) ligand.

In certain embodiments, $L_6$ is selected from a pyridine based ligand, a nitrile based ligand, an ether based ligand, a thioether based ligand, a phosphine (such as trialkyl phosphine) based ligand, a saturated and unsaturated N-heterocyclic carbene (NHC) based ligand, and a cyclic(alkyl) (amino)carbene (CAAC) based ligand. Preferably, $L_6$ is selected from —$PMe_3$, —$PEt_3$, —$NC_5H_5$, —$NC_5H_4Br$, —N≡C—$CMe_3$,

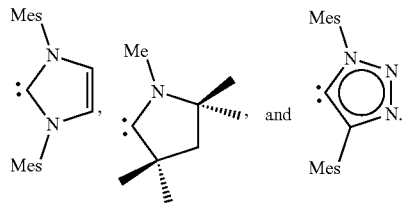

Representative anionic vanadium alkylidyne complexes provided by the subject invention include, but are not limited to, those shown in formulas (IVa)-(IVb) (cations are not shown for simplicity).

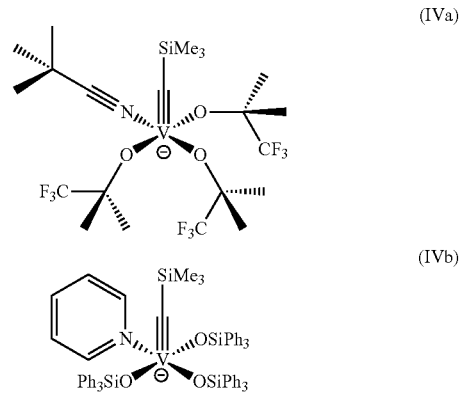

In some embodiments, these vanadium alkylidyne anionic complexes can be synthesized, for example, from neutral complexes V(≡CR)X$_2$L$_2$ and corresponding salts MX (M=Li, Na, K, R$_4$N$^+$, R$_4$P$^+$, (Ph$_3$P)$_2$N$^+$, etc.) in the presence of Lewis acids to remove one neutral ligand L.

In some embodiments, the vanadium alkylidyne complex provided by the present invention contains a polydentate ligand (bi- or tridentate ligand) for preventing ligand dissociation and preserving five-coordinate MCBD. Representative vanadium alkylidynes containing a polydentate ligand provided by the subject invention include, but are not limited to, those shown in formulas (Va)-(Ve) (counterions are not shown for simplicity).

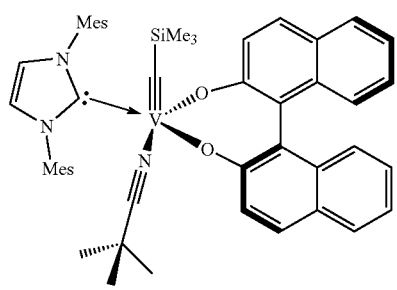
(Va)

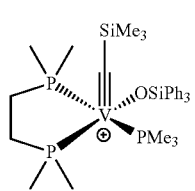
(Vb)

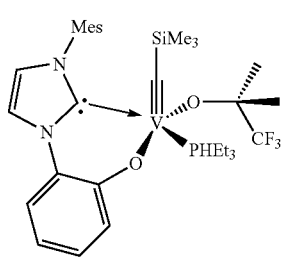
(Vc)

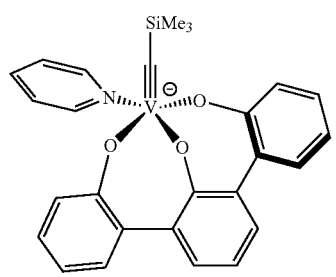
(Vd)

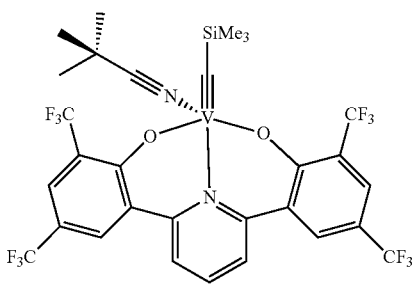
(Ve)

In some embodiments, these vanadium alkylidynes can be synthesized from neutral complexes V(≡CR)X$_2$L$_2$ and corresponding bi- and tridentate ligands by protonation or salt metathesis to introduce anionic moieties and ligand exchange to introduce neutral ligands.

In some embodiments, the vanadium alkylidyne presented by the subject invention is a five-coordinated complex containing four ligands in addition to the V≡C—R group, wherein each of the four ligands is an anionic ligand or a neutral ligand. In certain embodiments, the vanadium alkylidyne presented by the subject invention is a four-coordinated complex comprising three ligands in addition to the V≡C—R group, wherein each of the three ligands is an anionic ligand or a neutral ligand.

In some embodiments, the subject invention provides a vanadium alkylidyne complex comprising two anionic ligands and one neutral ligand in addition to the V≡C—R group, which has a structure of:

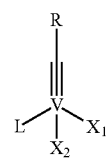

wherein L is a neutral ligand; X$_1$ and X$_2$ are anionic ligands; and R is alkyl, aryl or —Si(R$^a$)$_3$, wherein R$^a$ is selected from, for example, alkyl, substituted alkyl, aryl, and substituted aryl. In a specific embodiment, R is SiMe$_3$. In certain embodiments, each of X$_1$, X$_2$, and L is a monodentate ligand, or two of X$_1$, X$_2$, and L together form a bidentate ligand or a tridentate ligand.

In certain embodiments, each of X$_1$ and X$_2$ is independently selected from, for example, a silane based ligand, a siloxide based ligand, a phenoxide based ligand, an alkoxide based ligand, an alkylthio based ligand, an arylthiol based ligand, a thioalkoxide based ligand, a halide based ligand, and an iminato based ligand. In certain embodiments, X$_1$ and X$_2$ are each independently selected from, for example, halogens, silyl, alkylthio, arylthio, alkoxides, thioalkoxides, siloxides, NCO, NCS, NO$_3$, and pyrrolides.

In some embodiments, the vanadium alkylidyne complex provided by the present invention comprises a tripodal ligand to form a trigonal-pyramidal geometry. One of the crucial features of a tripodal scaffold is the destabilization of the MCBD intermediate and the formation of metallatetrahedrane (MTd), which opens up an alternative mechanism for alkyne metathesis. Since the stability of MCBD is the main challenge in V-mediated alkyne metathesis, introducing tripodal ligands can be highly beneficial for reactivity.

Representative vanadium alkylidynes containing a tripodal ligand provided by the subject invention include, but are not limited to, those shown in formulas (VIa)-(VIc) (anion in the cationic complex is not shown for simplicity).

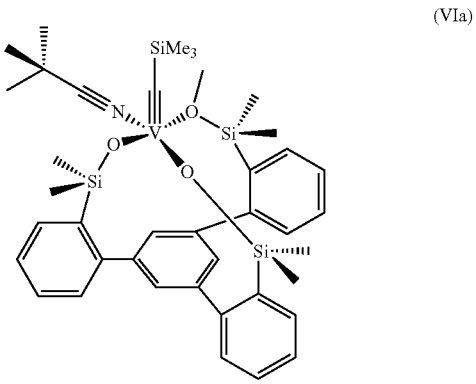
(VIa)

-continued

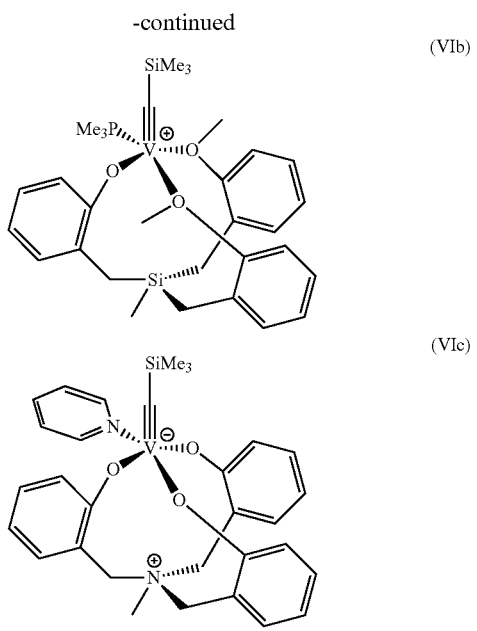

(VIb)

(VIc)

In some embodiments, these vanadium alkylidynes can be synthesized from neutral complexes V(≡CR)X₂L₂ and corresponding tripodal ligands by protonation or salt metathesis to introduce anionic moieties and ligand exchange to introduce neutral ligands.

Methods of Synthesizing Vanadium Alkylidyne Complexes

In one embodiment, the subject invention provides methods for synthesizing vanadium alkylidyne complexes of the subject invention. The method described herein can be used to synthesize vanadium alkylidyne complexes that are neutral, cationic or anionic.

The present invention provides simple, scalable, and reproducible methods for converting a V(+5) oxo complex to a V(+5) alkylidyne in three steps without altering the oxidation state of the metal center. This method involves a unique transformation using the anionic V alkylidene intermediate, which ultimately leads to a reduction in the bond order between V and the oxo ligand. Such transformation is rare, considering the high strength of the V=O bond.

In specific embodiments, the method of the subject invention involves creating an anionic V alkylidene complex that contains a nucleophilic oxygen atom, making it reactive toward electrophiles such as silyl chlorides. Subsequent α-hydrogen abstraction from the alkylidene results in the formation of alkylidynes.

In a specific embodiment, the subject invention provides a method of synthesizing the vanadium alkylidyne complex of the subject invention, in which the V oxo trialkyl complex VO(CH₂TMS)₃ reacts with strong bases, including MN(TMS)₂ (M=Li or K), or organolithium reagents (RLi), to form V anionic alkylidene. Those complexes react with R₃SiCl in the presence of bipyridine to form V alkylidynes. Then, V alkylidynes react with alkynes to form metallacyclobutadiene, a key intermediate in alkyne metathesis.

In specific embodiments, the vanadium alkylidyne complex provided by the subject invention can be synthesized using two strategies shown in FIG. 3A: 1) α-hydrogen abstraction in the reaction between anionic alkylidene and silyl chlorides in the presence of corresponding neutral ligands (FIG. 3A, top); 2) ligand exchange reaction between dtbbpy complexes and corresponding neutral ligands in the presence of ZnCl₂ (FIG. 3A, bottom).

In some embodiments, the present invention provides a method of synthesizing a vanadium alkylidyne complex, the method comprising steps of:
(1) reacting a vanadium oxo trialkoxyl complex with an alkylating agent to form a vanadium oxo trialkyl complex;
(2) treating the vanadium oxo trialkyl complex with an alkaline reagent in the presence of one or more neutral ligands (e.g., a bipyridine ligand) to form an anionic vanadium alkylidene intermediate; and
(3) reacting the anionic vanadium alkylidene intermediate with an electrophile.

In certain embodiments, the vanadium oxo trialkoxyl complex is selected from, for example, VO(OCH₃)₃ (Vanadium oxo trimethoxide), VO(OCH₂CH₃)₃ (Vanadium oxo triethoxide), VO(O$^i$Pr)₃ (Vanadium oxo triisopropoxide or vanadium oxytriisopropoxide), VO(O$^t$Bu)₃ (Vanadium oxo tri-tert-butoxide), and VO(OC₆H₅)₃ (Vanadium oxo triphenoxide). In certain embodiments, the alkylating agent is selected from, for example, TMSCH₂Li, TMSCH₂MgCl, (TMSCH₂)₂Zn, (TMSCH₂)₃Al, and any combination thereof.

The ratio of the vanadium oxo trialkoxyl complex to the alkylating agent is a key factor to avoid the reduction of V species. In certain embodiments, about 1.0-3.0, about 1.1-2.9, about 1.2-2.9, about 1.3-2.9, about 1.4-2.9, about 1.5-2.9, about 1.6-2.9, about 1.7-2.9, about 1.8-2.9, about 1.9-2.9, about 2.0-2.9, about 2.1-2.9, about 2.2-2.9, about 2.3-2.9, about 2.4-2.9, about 2.5-2.9, about 2.6-2.9, about 2.7-2.9, about 2.8-2.9, about 1.0-2.8, about 1.0-2.7, about 1.0-2.6, about 1.0-2.5, about 1.0-2.4, about 1.0-2.3, about 1.0-2.2, about 1.0-2.1, about 1.0-2.0, about 1.0-1.9, about 1.0-1.8, about 1.0-1.7, about 1.0-1.6, about 1.0-1.5, about 1.0-1.4, about 1.0-1.3, about 1.0-1.2, or about 1.0-1.1 equivalents of the alkylating agent are used in step (1) for every 1 equivalent of the vanadium oxo trialkoxyl complex. In a specific embodiment, the amount of the alkylating agent used in step (1) is not 3.0 equivalents for every 1 equivalent of the vanadium oxo trialkoxyl complex. In certain embodiments, about 1.7-2.9, about 1.8-2.8, about 1.9-2.7, about 2.0-2.6, about 2.1-2.5, or about 2.2-2.4 equivalents of the alkylating agent are used in step (1) for every 1 equivalent of the vanadium oxo trialkoxyl complex. In preferred embodiments, about 2.3 equivalents of the alkylating agent are used in step (1) for every 1 equivalent of the vanadium oxo trialkoxyl complex.

In one embodiment, reacting a vanadium oxo trialkoxyl complex with an alkylating agent to form a vanadium oxo trialkyl complex comprises mixing the vanadium oxo trialkoxyl complex with the alkylating agent or adding the alkylating agent to the vanadium oxo trialkoxyl complex.

In certain embodiments, the reaction of step (1) can be carried out in a solvent selected from, for example, pentane, hexane, heptane, cyclohexane, isohexane, diethyl ether (Et₂O), tetrahydrofuran (THF), dioxane, dimethyl ether (DME), methyl tert-butyl ether (MTBE), and any combination thereof.

In certain embodiments, the solvent is a mixture of a solvent selected from pentane, hexane, heptane, cyclohexane and isohexane, and a solvent selected from Et₂O, THF, dioxane, DME and MTBE, with two solvents mixed at a volume ratio of about 8:1 to about 2:1, about 7:1 to about 2:1, about 6:1 to about 2:1, about 8:1 to about 3:1, about 8:1 to about 4:1, about 8:1 to about 5:1, about 7:1 to about 3:1, about 6:1 to about 3:1, about 7:1 to about 4:1, about 7:1 to about 5:1, about 6:1 to about 4:1, or about 6:1 to about 5:1.

In certain embodiments, step (1) comprises mixing the vanadium oxo trialkoxyl complex with the alkylating agent in a solvent at a temperature of about −60 to −90° C., stirring the reaction mixture at the above temperature for about 10-60 mins, and then allowing the reaction mixture to stir at a temperature of about 10 to 40° C. for an additional about 10-60 mins. In some embodiments, the vanadium oxo trialkoxyl complex can be mixed with the alkylating agent in the solvent at a temperature of about −60 to −90° C., about −65 to −90° C., about −70 to −90° C., about −75 to −90° C., about −60 to −85° C., about −60 to −80° C., about −65 to −85° C., about −70 to −85° C., about −75 to −85° C., or about −75 to −80° C.

In some embodiments, step (1) comprises stirring the reaction mixture at a temperature of about −60 to −90° C. for about 10-60 mins, about 20-60 mins, about 30-60 mins, about 10-50 mins, about 10-40 mins, about 10-30 mins, about 20-50 mins, about 30-50 mins, about 20-40 mins, or about 20-30 mins. In some embodiments, step (1) further comprises stirring the reaction mixture at a temperature of about 10 to 40° C., about 20 to 40° C., about 20 to 30° C., or about 20 to 25° C. for an additional about 10-60 mins, about 20-60 mins, about 30-60 mins, about 10-50 mins, about 10-40 mins, about 10-30 mins, about 20-50 mins, about 30-50 mins, about 20-40 mins, or about 20-30 mins.

In certain embodiments, the reaction of step (1) is carried out under an inert atmosphere of argon or nitrogen.

In specific embodiments, the reaction of step (1) produces a vanadium oxo trialkyl complex such as $VO(CH_2TMS)_3$, which is then used in step (2) as a reactant. In some embodiments, step (1) further comprises purifying the vanadium oxo trialkyl complex such as $VO(CH_2TMS)_3$ via crystallization, distillation, chromatography, extraction, sublimation, precipitation, filtration, dialysis, or any combination thereof. In certain embodiments, the vanadium oxo trialkyl complex such as $VO(CH_2TMS)_3$, obtained from step (1) can be purified by dissolving in $Et_2O$ and recrystallizing at about −35° C.

In certain embodiments, treating the vanadium oxo trialkyl complex with an alkaline reagent in the presence of one or more neutral ligands comprises mixing the alkaline reagent and one or more neutral ligands with the vanadium oxo trialkyl complex or adding the alkaline reagent and one or more neutral ligands to the product of step (1).

In specific embodiments, the one or more neutral ligands are selected from bipyridine ligands. In certain embodiments, the bipyridine ligand is selected from, for example, 2,2'-bipyridine (bipy or bpy), 4,4'-dimethyl-2,2'-bipyridine, 4,4'-di-tert-butyl-2,2'-bipyridine (dtbbpy), 5,5'-dimethyl-2,2'-bipyridine, 6,6'-dimethyl-2,2'-bipyridine, 4,4'-di-tert-butyl-6,6'-dimethyl-2,2'-bipyridine, 4,4'-dicarboxy-2,2'-bipyridine, 4,4'-diamino-2,2'-bipyridine, 3,3'-bipyridine, and 6,6'-bis(phenyl)-2,2'-bipyridine.

In certain embodiments, the alkaline reagent is $MN(TMS)_2$ (M=Li or K), or an organolithium reagent (RLi). Examples of the organolithium reagent include, but are not limited to, methyllithium (MeLi), ethyllithium (EtLi), n-butyllithium (n-BuLi), sec-butyllithium (s-BuLi), tert-butyllithium (t-BuLi), phenyllithium (PhLi), o-tolyllithium (o-$CH_3C_6H_4Li$), m-tolyllithium (m-$CH_3C_6H_4Li$), p-tolyllithium (p-$CH_3C_6H_4Li$), lithium naphthalenide ($LiC_{10}H_8$), vinyllithium ($CH_2$=CHLi), lithium (trimethylsilyl) ethynyllithium ($Me_3SiC≡CLi$), lithium diisopropylamide (LDA, ($^iPr)_2NLi$), lithium tetramethylpiperidide (LiTMP), and lithium hexamethyldisilazide (LiHMDS).

In certain embodiments, for every 1 equivalent of the vanadium oxo trialkyl complex such as $VO(CH_2TMS)_3$, about 1.0-1.5, about 1.0-1.4, about 1.0-1.3, or about 1.0-1.2 equivalents of the alkaline reagent, and about 1.0-1.5, about 1.0-1.4, about 1.0-1.3, about 1.0-1.2, or about 1.0-1.1 equivalents of the bipyridine ligand are used. In preferred embodiments, about 1.1 equivalents of the alkaline reagent and about 1.0 equivalent of the bipyridine ligand are used for every 1 equivalent of the vanadium oxo trialkyl complex such as $VO(CH_2TMS)_3$.

In certain embodiments, the reaction of step (2) is carried out in a solvent selected from, for example, pentane, hexane, heptane, cyclohexane, isohexane, diethyl ether ($Et_2O$), tetrahydrofuran (THF), dioxane, dimethyl ether (DME), methyl tert-butyl ether (MTBE), and any combination thereof. In certain embodiments, the solvent suitable for use in step (2) is a mixture of a solvent selected from pentane, hexane, heptane, cyclohexane and isohexane, and a solvent selected from $Et_2O$, THF, dioxane, DME and MTBE, with the two solvents mixed at a volume ratio of about 2:1 to about 1:2, about 1.5:1 to about 1:2, about 1:1 to about 1:2, about 1:1.5 to about 1:2, about 2:1 to about 1:1.5, about 2:1 to about 1:1, about 1.5:1 to about 1:1.5.

In certain embodiments, step (2) comprises mixing the alkaline reagent and the vanadium oxo trialkyl complex such as $VO(CH_2TMS)_3$, at a temperature of about 10 to 40° C., about 20 to 40° C., about 20 to 30° C., or about 20 to 25° C., adding the bipyridine ligand to the obtained mixture at the above temperature, and then stirring the reaction mixture at the above temperature for at least about 5-30 mins, about 10-25 mins, about 10-20 mins, or about 10-15 mins.

In some embodiments, step (2) further comprises purifying the anionic vanadium alkylidene intermediate via crystallization, distillation, chromatography, extraction, sublimation, precipitation, filtration, dialysis, or any combination thereof. In certain embodiments, the anionic vanadium alkylidene intermediate obtained from step (2) can be purified by recrystallization from pentane, $Et_2O$, or isopropyl ether ($^iPr_2O$). The anionic vanadium alkylidene intermediate contains a nucleophilic oxygen atom, making it reactive toward electrophiles such as silyl chlorides.

In certain embodiments, reacting the anionic vanadium alkylidene intermediate with an electrophile comprises mixing the anionic vanadium alkylidene intermediate with the electrophile, adding the electrophile to the anionic vanadium alkylidene intermediate or adding the electrophile to the product of step (2).

In certain embodiments, the electrophile is a silyl chloride. Examples of silyl chlorides include, but are not limited to, $SiMe_2PhCl$, $SiMePh_2Cl$, and $SiPh_3Cl$.

In certain embodiments, about 1.0-1.5, about 1.0-1.4, about 1.0-1.3, about 1.0-1.2, or about 1.0-1.1 equivalents of the electrophile are used in step (3) for every 1 equivalent of the anionic vanadium alkylidene intermediate. In preferred embodiments, about 1.0 equivalent of the electrophile is used in step (3) for every 1 equivalent of the anionic vanadium alkylidene intermediate.

In certain embodiments, the reaction of step (3) can be carried out in a solvent selected from $Et_2O$, THF, dioxane, DME, MTBE, and any combination thereof.

In certain embodiments, step (3) comprises dissolving the anionic vanadium alkylidene intermediate in the solvent, cooling the obtained solution to about −20 to −50° C., about −20 to −45° C., about −20 to −40° C., about −25 to −50° C., about −30 to −50° C., or about −30 to −40° C., adding the electrophile at the above temperature, and stirring the reaction mixture at a temperature of about 10 to 40° C., about 20 to 40° C., about 20 to 30° C., or about 20 to 25° C. for at least about 5-30 mins, about 10-25 mins, about 10-20 mins, or about 10-15 mins.

In some embodiments, step (3) further comprises purifying the product via crystallization, distillation, chromatography, extraction, sublimation, precipitation, filtration, dialysis, or any combination thereof. In certain embodiments, the product obtained from step (3) can be purified by recrystallization from hexane or $Et_2O$.

In some embodiments, the method of synthesizing a vanadium alkylidyne further comprises a step of:

(4) reacting the product of step (3) with an alcohol reagent or a phenol reagent.

In certain embodiments, the alcohol reagent or the phenol reagent is selected from, for example, silanols, phenols, and thiophenols. Examples of the alcohol reagents or phenol reagents include, but are not limited to, $SiPh_3OH$, $SiMePh_2OH$, $Si(p-MeOC_6H_4)_3OH$, $SiMe_2PhOH$, o-$MeOC_6H_4OH$, m-$MeOC_6H_4OH$, p-$MeOC_6H_4OH$, o-$MeOC_6H_4SH$, m-$MeOC_6H_4SH$, p-$MeOC_6H_4SH$, 2,6-$(MeO)_2C_6H_3OH$, 2,5-$(MeO)_2C_6H_3OH$, 2,4-$(MeO)_2C_6H_3OH$, 2,3-$(MeO)_2C_6H_3OH$, 3,4-$(MeO)_2C_6H_3OH$, and 3,5-$(MeO)_2C_6H_3OH$.

In some embodiments, the method for synthesizing the vanadium alkylidyne complexes of the subject invention involves the use of corresponding silyl chlorides to introduce the siloxide groups and protonation of the alkyl group by corresponding acid (HX). The siloxide group can also be replaced by the protonation reaction. In certain embodiments, salt metathesis can be utilized for the anionic ligand exchange.

In some embodiments, the method for synthesizing the vanadium alkylidyne complexes of the subject invention further comprises replacing an anionic ligand X with a neutral ligand L of the vanadium alkylidyne neutral complexes $V(\equiv CR)X_2L_2$ by utilizing, for example, Brookhart's acid or NaBArF in the presence of the neutral ligand L to arrive at a vanadium alkylidyne cationic complexes. In a specific embodiment, such step comprises mixing the method for synthesizing the vanadium alkylidyne complexes of the subject invention further comprises with an acid, e.g., Brookhart's acid and NaBArF, and a neutral ligand.

In some embodiments, the method for synthesizing the vanadium alkylidyne complexes of the subject invention further comprises converting the vanadium alkylidyne neutral complexes $V(\equiv CR)X_2L_2$ to vanadium alkylidyne anionic complexes by mixing or adding corresponding salts MX (M=Li, Na, K, $R_4N^+$, $R_4P^+$, $(Ph_3P)_2N^+$, etc.) in the presence of Lewis acids to remove one neutral ligand L.

In some embodiments, the method of the subject invention further comprises exchanging ligands of the vanadium alkylidyne neutral complexes with bi- and tridentate ligands by protonation or salt metathesis In some embodiments, the method of the subject invention further comprises exchanging ligands of the vanadium alkylidyne neutral complexes with tripodal ligands by protonation or salt metathesis.

Applications

In one embodiment, the subject invention provides a method of using compounds/complexes having a metal center of a first-row metal, such as vanadium, for synthesizing unsaturated compounds via metathesis reactions.

In some embodiments, the method for synthesizing an unsaturated compound via a metathesis reaction (e.g., olefin metathesis or alkyne metathesis) comprises contacting at least one, two or three substrates with a compound/complex having a metal center selected from first-row metals or the composition comprising the compound/complex having a metal center selected from first-row metals. In specific embodiments, the substrates are selected from olefins and alkynes.

In one embodiment, the subject invention provides a method of using the vanadium alkylidyne complexes of the subject invention in various metathesis reactions (e.g., alkyne metathesis), the method comprising contacting/mixing at least one substrate with a vanadium alkylidyne complex of the subject invention or the composition comprising a vanadium alkylidyne complex of the subject invention.

In certain embodiments, the substates are unsaturated compounds such as olefins and alkynes. In specific embodiments, the substrates are compounds having an internal alkyne or a terminal alkyne.

The vanadium alkylidyne complexes as prepared and described herein can serve as catalysts in various metathesis reactions. Thus, the present invention also provides methods and processes involving the use of such new catalytic species, or any mixture of such species, or such catalytic systems, in a wide range of organic synthesis reactions including the metathesis of unsaturated compounds such as olefins and alkynes, and reactions involving the transfer of an atom or group to an ethylenically or acetylenically unsaturated compound or another reactive substrate, such as atom transfer radical polymerization, atom transfer radical addition, vinylation, cyclopropanation of ethylenically unsaturated compounds, and the like.

In one embodiment, the subject invention provides a method of performing a metathesis reaction of an unsaturated compound in the presence of a catalytic component, in particular, the vanadium alkylidyne complexes described and prepared herein, comprising contacting the unsaturated compound with the catalytic component or mixing the unsaturated compound with the catalytic component.

In preferred embodiments, the vanadium alkylidyne complex described herein is the only catalytic component used in the metathesis reaction.

The metathesis reaction according to the present invention can be olefin metathesis reactions or alkyne metathesis reactions, in particular, nitrile-alkyne metathesis, phosphaalkyne-alkyne metathesis, acyclic diyne metathesis polymerization (ADIMET), ring expansion alkyne metathesis polymerization (REAMP), and ring-opening alkyne metathesis polymerization (ROAMP). Accordingly, the unsaturated compound can be an olefin or an alkyne, for example, an internal alkyne such as ArC≡CMe (Ar=Ph or p-$MeOC_6H_4$), or a terminal alkyne. Employing these vanadium alkylidyne complexes in alkyne metathesis reactions, leading to the formation of metallacyclobutadiene intermediates essential for catalytic efficiency. Advantageously, the reversible nature of alkyne metathesis allows the chemical recycling of resulting materials.

The metathesis reaction of an unsaturated compound according to the present invention may be conducted in a continuous, semi-continuous, or batch manner and may involve a liquid and/or gas recycling operation, as desired. In particular, the metathesis reaction may be carried out in a liquid reaction medium that contains a solvent for the active catalyst, preferably one in which the reactants, including catalyst, are substantially soluble at the reaction temperature.

In one embodiment, the subject invention provides a method for synthesizing an unsaturated compound via a metathesis reaction, the method comprising contacting at least one, two, or three substrates with the vanadium alkylidyne complex of the subject invention or the composition comprising the vanadium alkylidyne complex of the subject invention, In one embodiment, the subject invention provides a method for synthesizing an unsaturated compound via alkyne cross-metathesis, the method comprising:
   providing a first substrate and a second substrate, each of the first and second substrate comprising at least one internal alkyne and/or a terminal alkyne;
   contacting the first and second substrates with a vanadium alkylidyne complex of the subject invention or a composition comprising the vanadium alkylidyne complex of the subject invention, wherein the vanadium alkylidyne complex catalyzes the alkyne cross-metathesis to produce the unsaturated compound comprising an internal alkyne and/or a terminal alkyne resulted from the cross metathesis of the first substrate and the second substrates; and
   optionally, collecting the unsaturated compound.

In one embodiment, the subject invention provides a method for synthesizing a polymer (e.g., unsaturated polymer) via acyclic diyne metathesis polymerization (ADIMET), the method comprising:
   providing at least one substrate, the at least one substrate comprising at least one internal alkyne and/or a terminal alkyne;
   contacting the at least one substrate with a vanadium alkylidyne complex of the subject invention or a composition comprising the vanadium alkylidyne complex of the subject invention, wherein the vanadium alkylidyne complex catalyzes the ADIMET to produce a polymer comprising a plurality of alkynes resulted from the ADIMET of the at least one substrate; and
   optionally, collecting the polymer.

In certain embodiments, the method for synthesizing a polymer via ADIMET comprises contacting two or more substrates with a vanadium alkylidyne complex of the subject invention or a composition comprising the vanadium alkylidyne complex of the subject invention.

In one embodiment, the subject invention provides a method for synthesizing a polymer (e.g., unsaturated polymer) via ring expansion alkyne metathesis polymerization (REAMP), the method comprising:
   providing at least one substrate, the at least one substrate comprising at least one internal alkyne and/or a terminal alkyne;
   contacting the at least one substrate with a vanadium alkylidyne complex of the subject invention or a composition comprising the vanadium alkylidyne complex of the subject invention, wherein the vanadium alkylidyne complex catalyzes the REAMP to produce a polymer comprising a plurality of alkynes resulted from the REAMP of the at least one substrate; and
   optionally, collecting the polymer.

In certain embodiments, the method for synthesizing a polymer via REAMP comprises contacting two or more substrates with a vanadium alkylidyne complex of the subject invention or a composition comprising the vanadium alkylidyne complex of the subject invention.

In one embodiment, the subject invention provides a method for synthesizing a polymer (e.g., unsaturated polymer) via ring-opening alkyne metathesis polymerization (ROAMP), the method comprising:
   providing at least one substrate, the at least one substrate comprising at least one internal alkyne and/or a terminal alkyne;
   contacting the at least one substrate with a vanadium alkylidyne complex of the subject invention or a composition comprising the vanadium alkylidyne complex of the subject invention, wherein the vanadium alkylidyne complex catalyzes the ROAMP to produce a polymer comprising a plurality of alkynes resulted from the ROAMP of the at least one substrate; and
   optionally, collecting the polymer.

In certain embodiments, the method for synthesizing a polymer via ROAMP comprises contacting two or more substrates with a vanadium alkylidyne complex of the subject invention or a composition comprising the vanadium alkylidyne complex of the subject invention.

In specific embodiment, the subject invention provides a method for synthesizing an unsaturated compound via a metathesis reaction (e.g., olefin metathesis or alkyne metathesis), the method comprising contacting at least one, two or three substrates with the vanadium alkylidyne complex of the subject invention (e.g., vanadium alkylidyne complexes having formula I, II, III, and IV) or the composition comprising the vanadium alkylidyne complex of the subject invention (e.g., vanadium alkylidyne complexes having formula I, II, III, and IV). In specific embodiments, the substrates are selected from olefins and alkynes. The vanadium alkylidyne complex catalyzes a cross-metathesis reaction between the substrates or a polymerization of the at least one, two or three substrates.

Definitions

To facilitate an understanding of the present invention, a number of terms and phrases are defined below. The terminology used herein is used only for the purpose of describing particular embodiments of the present invention and is not intended to be limiting in any way.

As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising." The transitional terms/phrases (and any grammatical variations thereof) "comprising," "comprises," and "comprise" can be used interchangeably; "consisting essentially of," and "consists essentially of" can be used interchangeably; and "consisting," and "consists" can be used interchangeably.

The transitional term "comprising," "comprises," or "comprise" is inclusive or open-ended and does not exclude additional, unrecited elements or method steps. By contrast, the transitional phrase "consisting of" excludes any element, step, or ingredient not specified in the claim. The phrases "consisting" or "consists essentially of" indicate that the claim encompasses embodiments containing the specified materials or steps and those that do not materially affect the basic and novel characteristic(s) of the claim. Use of the term "comprising" contemplates other embodiments that "consist" or "consisting essentially of" the recited component(s).

Except in the examples, or where otherwise expressly indicated, all numerical quantities in this description indicating amounts of material and/or use are to be understood as modified by the word "about" in describing the broadest scope of the invention. Practice within the numerical limits stated is generally preferred.

The term "about" or "approximately" means within an acceptable error range for the particular value as determined by one of ordinary skill in the art, which will depend in part on how the value is measured or determined, i.e., the limitations of the measurement system. For example, "about" can mean within 1 or more than 1 standard deviation, per the practice in the art. Alternatively, "about" can mean a range of up to 0-20%, 0 to 10%, 0 to 5%, or up to 1% of a given value. Where particular values are described in the application and claims, unless otherwise stated the term "about" meaning within an acceptable error range for the particular value should be assumed. In the context of compositions containing amounts of concentrations of ingredients where the term "about" is used, these values include a variation (error range) of 0-10% around the value (X±10%).

Ranges are stated in shorthand to avoid having to set out at length and describe each and every value within the range. Any appropriate value within the range can be selected, where appropriate, as the upper value, lower value, or the terminus of the range. For example, a range of 0.1-1.0 represents the terminal values of 0.1 and 1.0, as well as the intermediate values of 0.2, 0.3, 0.4, 0.5, 0.6, 0.7, 0.8, 0.9, and all intermediate ranges encompassed within 0.1-1.0, such as 0.2-0.5, 0.2-0.8, 0.7-1.0, etc. Values having at least two significant digits within a range are envisioned, for example, a range of 5-10 indicates all the values between 5.0 and 10.0 as well as between 5.00 and 10.00 including the terminal values. When ranges are used herein, combinations and subcombinations of ranges (e.g., subranges within the disclosed range) and specific embodiments therein are explicitly included.

The term "and/or" as used herein refers to and encompasses any and all possible combinations of one or more of the associated listed items. For example, the phrase "A, B, and/or C" includes A alone, B alone, C alone, the combination of A and B, the combination of A and C, the combination of B and C, and the combination of A, B, and C. Also, the term "or" is used in its inclusive sense (and not in its exclusive sense) so that when used, for example, to connect a list of items, the term "or" means one, some, or all of the items in the list. Conjunctive language such as the phrase "at least one of X, Y, and Z," unless specifically stated otherwise, is otherwise understood with the context as used in general to convey that an item, term, etc. may be either X, Y, or Z; X and Y; X and Z; Y and Z; or X, Y, and Z (i.e., any combination of X, Y, and Z).

As used herein, the term "complex" or "coordinated" compound, refers to the result of a donor-acceptor mechanism or Lewis acid-base reaction between a metal (the acceptor) and several neutral molecules or ionic compounds called ligands, each containing a non-metallic atom or ion (the donor).

As used herein, the term "monodentate ligand" refers to a ligand that has only one atom with lone pairs of electrons (i.e. only one point of attachment to the metal center) and therefore occupies one coordination site; the term "polydentate ligand" refers to a ligand that has more than one atom with lone pairs of electrons (i.e. more than one point of attachment to the metal center) and therefore occupies more than one coordination site. Depending upon the number of coordination sites occupied, the ligands described herein include monodentate, bidentate, and tridentate ligands.

The term "alkene" refers to any hydrocarbon that contains one or more carbon-carbon double bonds. "Alkene" can include straight-chain, branched, and cyclic alkenes (including monocyclic and polycyclic alkenes). Examples include, but are not limited to, ethane, propene, butene, pentene, hexene, heptene, octene, nonene, decene, dodecene, propadiene, butadiene, pentadiene, hexadiene, octadiene, and the like.

The term "alkyne" refers to any hydrocarbon that contains one or more carbon-carbon triple bonds. "Alkyne" can include straight-chain, branched, and cyclic alkynes. Those with one triple bond have a general formula of $C_nH_{2n-2}$. Examples include, but are not limited to, ethyne, propyne, butyne, pentyne, hexyne, heptyne, octyne, nonyne, decyne, and the like.

As used herein, "alkyl" refers to saturated monovalent radicals of at least one carbon atom or a branched saturated monovalent of at least three carbon atoms. It can include straight-chain alkyl groups, branched-chain alkyl groups, cycloalkyl (alicyclic) groups, alkyl substituted cycloalkyl groups, and cycloalkyl substituted alkyl groups. It may include hydrocarbon radicals of at least one carbon atom, which may be linear. Examples include, but are not limited to, methyl, ethyl, propyl, 2-propyl, n-butyl, iso-butyl, tert-butyl, pentyl, hexyl, and the like.

As used herein, "aryl" refers to a carbocyclic (all carbon) monocyclic or multicyclic aromatic ring system (including fused ring systems where two carbocyclic rings share a chemical bond). The number of carbon atoms in an aryl group can vary. For example, the aryl group can be a $C_6$-$C_{14}$ aryl group, a $C_6$-$C_{10}$ aryl group, or a $C_6$ aryl group. Examples of aryl groups include, but are not limited to, phenyl, benzyl, α-naphthyl, β-naphthyl, biphenyl, anthryl, tetrahydronaphthyl, fluorenyl, indanyl, biphenylenyl, and acenaphthenyl. Preferred aryl groups are phenyl and naphthyl.

As used herein, "halogen" refers to an atom of fluorine, chlorine, bromine or iodine.

As used herein, a "substituted" group may be substituted with one or more group(s) individually and independently selected from, for example, alkyl, alkenyl, alkynyl, cycloalkyl, cycloalkenyl, cycloalkynyl, benzyl, substituted benzyl, aryl, heteroaryl, heteroalicyclyl, aralkyl, heteroaralkyl, (heteroalicyclyl)alkyl, hydroxy, protected hydroxy, alkoxy, aryloxy, acyl, mercapto, alkylthio, arylthio, cyano, halogen, thiol, thiocarbonyl, O-carbamyl, N-carbamyl, O-thiocarbamyl, N-thiocarbamyl, C-amido, N-amido, S-sulfonamido, N-sulfonamido, C-carboxy, protected C-carboxy, O-carboxy, isocyanato, thiocyanato, isothiocyanato, nitro, silyl, sulfenyl, sulfinyl, sulfonyl, haloalkyl, haloalkoxy, trihalomethanesulfonyl, trihalomethanesulfonamido, an amino, a mono-substituted amino group and a di-substituted amino group, and protected derivatives thereof.

As used herein, the term "alcohol" is art-recognized and refers to any substance having an OH group attached to a carbon. In certain embodiments, the alcohol is a primary alcohol, a secondary alcohol, or a tertiary alcohol. In some embodiments, the alcohol is a monohydric alcohol or a polyhydric alcohol. In certain embodiments, the alcohol is a diol, triol, tetraol, pentol, or hexol. In one embodiment, the alcohol is an aliphatic alcohol including saturated aliphatic or unsaturated aliphatic alcohol. In some embodiments, the alcohol is an allylic, homoallylic, doubly allylic, doubly homoallylic, propargylic, homopropargylic, doubly propargylic, doubly homopropargylic, benzylic, homobenzylic, doubly benzylic, or doubly homobenzylic alcohol. In certain embodiments, the alcohol is a glycol, a glycerol, an erythritol, a xylitol, a mannitol, an inositol, a menthol or a naturally or non-naturally occurring sugar. In other embodiments, the alcohol is a cycloalkanol, a phenol or other aryl alcohol, or a heteroaryl alcohol. Any of the aforementioned alcohols may be optionally substituted with one or more halogens, alkyls, alkenyls, alkynyls, hydroxyls, aminos, nitros, thiols, amines, imines, amides, phosphonates, phosphines, carbonyls, carboxyls, silyls, ethers, thioethers, sulfonyls, selenoethers, ketones, aldehydes, esters, fluoroalkyls, trifluoromethyl, and cyano groups. Examples include, but are not limited to, methanol, ethanol, isopropyl alcohol, butyl alcohol, isobutyl alcohol, t-butanol, pentanol, pentan-2-ol, pentan-3-ol, hexanol, heptanol, octanol, cyclopentanol, cyclohexanol, benzyl alcohol, 2-phenylethan-1-ol, 2-phenylpropan-2-ol, 5-phenyl-pent-1-ol, 2,2,2-trifluoroethan-1-ol, 2-methoxyethan-1-ol and the like.

Throughout this application, where publications are referenced, the disclosures of these publications in their entireties are hereby referred to in this application to more fully describe the state of the art to which this invention pertains.

Abbreviations used herein include: V, vanadium; NBO, natural bond orbital; NHC, N-heterocyclic carbene; iPr, isopropyl; THF, tetrahydrofuran; TMS, trimethylsilyl group.

Unless otherwise defined, all terms of art, notations and other scientific terms or terminology used herein are intended to have the meanings commonly understood by those of skill in the art to which this invention pertains. In some cases, terms with commonly understood meanings are defined herein for clarity and/or for ready reference, and the inclusion of such definitions herein should not necessarily be construed to represent a substantial difference over what is generally understood in the art. It will be further understood that terms, such as those defined in commonly used dictionaries, should be interpreted as having a meaning that is consistent with their meaning in the context of the relevant art and/or as otherwise defined herein.

EXAMPLES

Materials and Methods

General Experimental Details

All reactions involving air and moisture-sensitive materials were performed in a nitrogen-filled MBraun glovebox or otherwise in a Schlenk line. All glassware was oven-dried prior to use (160° C.). Solvents used, such as diethyl ether (Et$_2$O), n-hexane, pentane, etc., were dried using the Na/benzophenone system and stored in the glovebox under an inert atmosphere over 3 Å molecular sieves (which were also oven-dried beforehand). C$_6$D$_6$ was stored in the glovebox under 3 Å molecular sieves as well. NMR spectra were obtained on Bruker 400 MHz and 600 MHz spectrometers. Chemical shifts for $^1$H and $^{13}$C spectra are reported in parts per million (ppm) and use the residual $^1$H and $^{13}$C resonances of the deuterated solvent as reference ($^1$H S: CD$_2$Cl$_2$ 5.32, C$_6$D$_6$ 7.16, $^{13}$C δ: CD$_2$Cl$_2$ 53.84, C$_6$D$_6$ 128.06). All NMR data shown have the following format: chemical shift, multiplicity (s=singlet, d=doublet, t=triplet, m=multiplet, br=broad), coupling constants (Hz), and integration.

Starting Materials

Reagents were purchased at the highest commercial quality and utilized without further purification unless otherwise stated. Vanadium(V) oxytriisopropoxide (97.0%+), (Trimethylsilyl) methyl magnesium chloride (1.00 M solution in Et$_2$O), triphenylchlorosilane (95%+), triphenylsilanol (95%+), and phenyldimethylchlorosilane (96%+) were purchased from TCI America. 4,4'-di-tert-butyl-2,2'-bipyridine (dtbbpy) (98.0%+) was purchased from Sigma Aldrich. Lithium bis(trimethylsilyl)amide (LiN(TMS)$_2$, 95%+) and chloro(methyl) diphenylsilane (97%+) were purchased from Thermo Scientific Chemicals.

Vanadium(V) oxytriisopropoxide

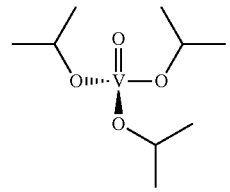

Vanadium(V) oxytriisopropoxide is commercially available, whose spectra is provided as:

$^1$H NMR: (C$_6$D$_6$, 400 MHz) δ 5.11 (sept, 3H, J=6.4 Hz), 1.33 (d, 18H, J=6.4 Hz).
$^{51}$V NMR: (C$_6$D$_6$, 105 MHz) δ−630 ppm.

Synthesis of Vanadium Alkylidene Complexes

VO(CH$_2$TMS)$_3$ (1)

Figure 4:
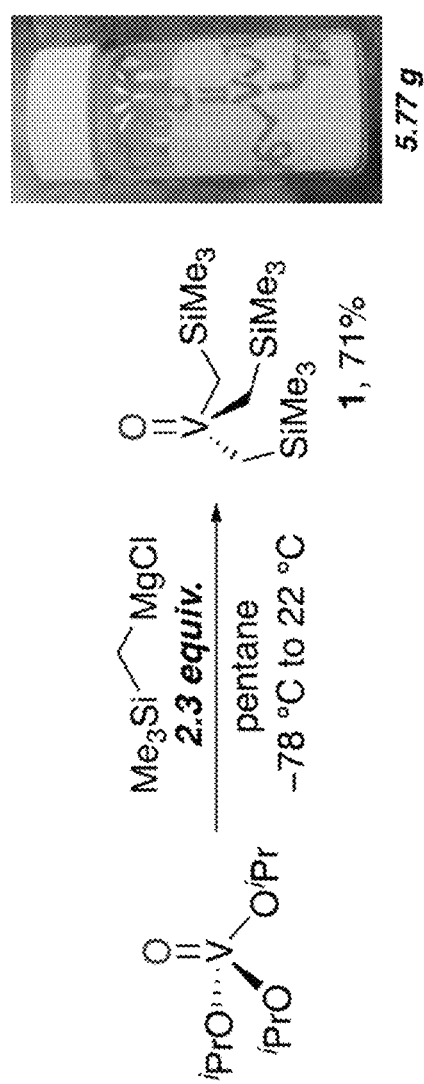
FIG. 4 shows a scheme for synthesis of complex 1.

Inside the glovebox, vanadium(V) oxytriisopropoxide (7.84 g, 32.10 mmol, 1 equiv.) was placed in a Schlenk flask. The flask was sealed with a septum, taken out from the glovebox, and connected to the Schlenk line via a hose. The hose was connected to a vacuum for one minute and then to nitrogen. The procedure was repeated twice (three times total) to ensure there was no air between the Schlenk line and the Schlenk flask in the hose. The Schlenk flask's valve was opened to nitrogen. The septum was removed, and 400 ml of pentane was added (HPLC grade pentane; no additional purification was used). The flask was sealed with a septum. The flask was immersed in an acetone/dry ice bath. The reaction mixture was stirred in the cooling bath for 10 minutes to ensure the reaction mixture (RM) was cooled down. During that time, RM remained colorless. Solution of TMSCH$_2$MgCl in Et$_2$O (1.0 M, 73.8 ml, 73.82 mmol, 2.3 equiv.) was slowly added dropwise to the stirred solution via syringe at −78° C. RM becomes red-brown during this time. RM was stirred for 30 minutes in an acetone/dry ice bath. The cooling bath was removed, and RM was stirred at room temperature for 30 minutes. A white precipitate formed (Mg salts) during warming up, while the RM became a yellow-green suspension. The flask was transferred to the glovebox. The precipitate was filtered off with celite and washed with pentane until the precipitate (Mg salts) became an off-white solid. The yellow-green pentane solution was connected to a vacuum to remove pentane and produce a yellow-green solid. The green solid was dissolved in the minimal amount of Et$_2$O and placed in the freezer at −35° C. to recrystallize. After overnight the yellow crystals were filtered off and dried under vacuum (FIG. 4). M=5.77 g (71% based on TMSCH$_2$MgCl). Spectroscopic data were consistent with those reported in the literature.

$^1$H NMR: (C$_6$D$_6$, 400 MHz) δ 1.71-1.92 (br. s, 6H), 0.17 (s, 27H).
$^{51}$V NMR: (C$_6$D$_6$, 105 MHz) δ 483 ppm.

VOLi(dtbbpy)(CHSiMe$_3$)(CH$_2$SiMe$_3$)$_2$ (2·dtbbpy)

Figure 5:
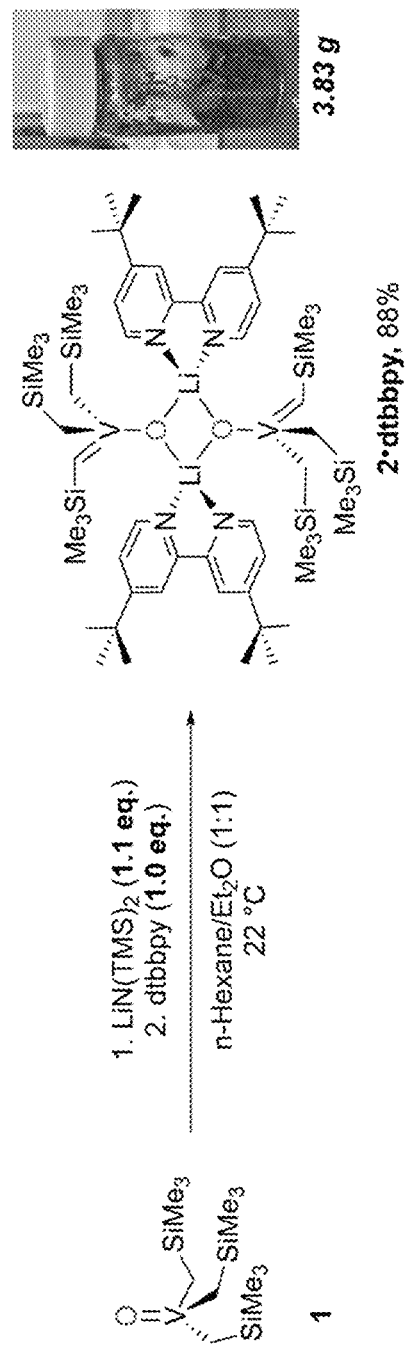
FIG. 5 shows a scheme for synthesis of complex 2·dtbbpy.

4,4'-di-tert-butyl-2,2'-bipyridine (dtbbpy) (1.94 g, 7.24 mmol, 1.0 equiv.) was dissolved in 58 mL of Et$_2$O to form a clear, colorless solution. A solution of LiN(TMS)$_2$ (1.33 g, 7.96 mmol, 1.1 equiv.) in n-hexane (58 mL) was added to solid complex 1 (2.38 g, 7.24 mmol, 1.0 equiv.) under stirring to generate an anionic alkylidene complex 2, upon addition the solution changed from yellow to dark green. The solution of the dtbbpy in ether was then added to the solution of the anionic alkylidene complex 2. The reaction was allowed to stir for 10-15 min. at RT, during which the solution changed from dark green to dark blue. Upon completion, the solvents were removed, and the dark blue residue that formed was washed with n-hexane, filtered, dried, and placed into the glovebox freezer as a lavender powder (FIG. 5). M=3.83 g (88%). If further purification is required, the product can be recrystallized from pentane, Et$_2$O, or isopropyl ether ($^i$Pr$_2$O).

$^1$H NMR: (C$_6$D$_6$, 400 MHz) δ 15.73 (s, 2H), 9.30 (d, J=5.3 Hz, 4H), 8.04 (d, J=1.5 Hz, 4H), 7.21 (dd, J=5.3, 1.7 Hz, 4H), 1.11 (s, 36H), 0.39 (d, J=11.0 Hz, 4H), 0.24 (s, 18H), 0.17 (s, 36H), −0.09 (d, J=10.3 Hz, 4H).

$^{13}$C NMR (C$_6$D$_6$, 101 MHz) δ 343.1, 171.0, 161.6, 156.3, 121.0, 115.1, 29.7, 13.6, 7.8, −26.1, −26.6.

$^{51}$V NMR: (C$_6$D$_6$, 105 MHz) δ 883.8 ppm.

Anal. Calcd for C$_{60}$H$_{112}$Li$_2$N$_4$O$_2$Si$_6$V$_2$: C, 59.76%; H, 9.36%; N, 4.65%. Found: C, 58.28%; H, 8.50%; N, 4.67%.

General Procedure for 6a-c

Figure 6:
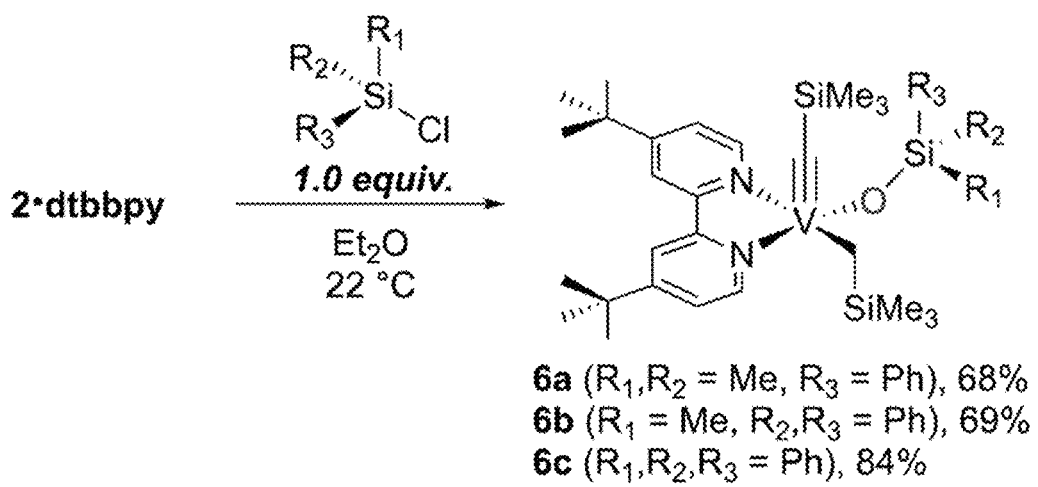
FIG. 6 shows a scheme for synthesis of complexes 6a-6c.

Complex 2·dtbbpy (0.754 g, 1.25 mmol, 1.0 equiv.) was dissolved in 7.5 mL Et$_2$O and cooled to −35° C. for 30 minutes before the corresponding chlorosilane (1.25 mmol, 1.0 equiv.) was added slowly. The reaction mixture was allowed to stir for 10-15 min., during which the solution changed from dark blue to brown, before being filtered to another container (to remove the LiCl that forms). The Et$_2$O was evaporated, and the resulting brown residue was washed with n-hexane, filtered, and dried under a vacuum. The alkylidyne products appear as brown powder-like solids (FIG. 6).

V(CSiMe$_3$)(dtbbpy)(CH$_2$SiMe$_3$)(OSiPhMe$_2$) (6a)

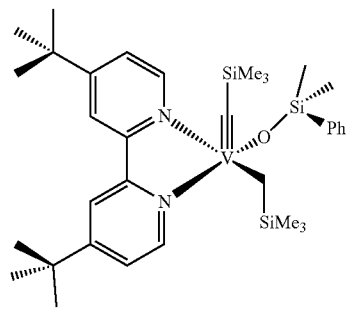

Purification of 6a can be conducted via various means, such as washing with pentane. M=0.650 g (81%).

$^1$H NMR: (C$_6$D$_6$, 400 MHz) δ 9.96 (d, J=5.8 Hz, 2H), 8.40 (d, J=7.2 Hz, 2H), 7.60 (d, J=1.3 Hz, 2H), 7.47 (t, J=7.4 Hz, 3H), 7.35 (dd, J=9.4, 5.2 Hz, 1H), 6.74 (d, J=4.8 Hz, 2H), 2.97 (d, J=13.2 Hz, 1H), 1.22 (s, 3H), 1.07 (d, J=13.2 Hz, 1H), 1.05 (s, 3H), 0.92 (s, 18H), 0.14 (s, 9H), 0.01 (s, 9H).

$^{13}$C NMR: (C$_6$D$_6$, 151 MHz) δ 417.2, 163.2, 153.3, 152.4, 145.7, 134.7, 128.7, 128.3, 121.6, 117.0, 46.2, 34.9, 30.1, 3.6, 3.2, 3.0, 1.4.

$^{51}$V NMR: (C$_6$D$_6$, 105 MHz) δ 573.5.

Anal. Calcd for C$_{34}$H$_{55}$N$_2$OSi$_3$V: C, 63.51%; H, 8.62%; N, 4.36%. Found: C, 60.16%; H, 8.16%; N, 3.72%.

V(CSiMe$_3$)(dtbbpy)(CH$_2$SiMe$_3$)(OSiPh$_2$Me) (6b)

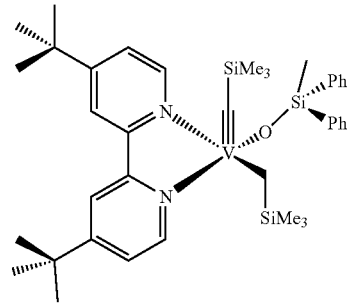

Recrystallized from n-hexane at −35° C. M=0.606 g (69%).

$^1$H NMR: (C$_6$D$_6$, 600 MHz) δ 9.95 (d, J=5.2 Hz, 2H), 8.47 (d, J=7.2 Hz, 2H), 8.29 (d, J=7.2 Hz, 2H), 7.61 (s, 2H), 7.43 (t, J=7.3 Hz, 2H), 7.40 (t, J=7.3 Hz, 2H), 7.34-7.28 (m, 2H), 6.74 (s, 2H), 3.02 (d, J=13.1 Hz, 1H), 1.35 (s, 3H), 0.99 (d, J=13.1 Hz, 1H), 0.93 (s, 18H), 0.09 (s, 9H), −0.06 (s, 9H).

$^{13}$C NMR: (C$_6$D$_6$, 151 MHz) δ 419.3, 163.3, 153.4, 152.4, 143.1, 142.7, 135.8, 135.5, 128.9, 128.3, 128.0, 121.6, 117.1, 48.3, 34.9, 30.1, 2.9, 2.2, 1.3.

$^{51}$V NMR: (C$_6$D$_6$, 105 MHz) δ 590.0.

Anal. Calcd for C$_{39}$H$_{57}$N$_2$OSi$_3$V: C, 66.43%; H, 8.15%; N, 3.97%. Found: C, 65.25%; H, 8.10%; N, 3.86%.

V(CSiMe$_3$)(dtbbpy)(CH$_2$SiMe$_3$)(OSiPh$_3$) (6c)

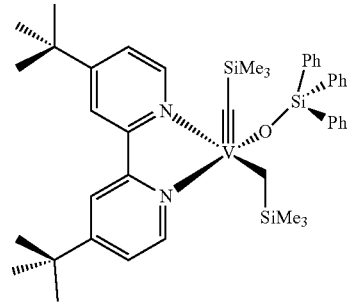

Recrystallized from Et$_2$O at −35° C. M=0.805 g (84%).

$^1$H NMR: (CD$_2$Cl$_2$, 400 MHz) δ 9.78 (d, J=5.8 Hz, 2H), 8.15 (s, 2H), 7.98 (d, J=7.1 Hz, 6H), 7.40 (dd, J=13.0, 6.7 Hz, 9H), 2.58 (d, J=12.8 Hz, 1H), 1.48 (s, 18H), 0.30 (d, J=12.7 Hz, 1H), −0.42 (s, 9H), −0.56 (s, 9H).

$^{13}$C NMR: (CD$_2$Cl$_2$, 101 MHz) δ 421.0, 163.8, 152.8, 152.1, 140.0, 135.9, 128.6, 127.2, 121.3, 117.6, 49.1, 35.2, 30.1, 1.8, 0.1.

$^{51}$V NMR: (CD$_2$Cl$_2$, 105 MHz) δ 617.0.

Anal. Calcd for C$_{44}$H$_{59}$N$_2$OSi$_3$V: C, 68.89%; H, 7.75%; N, 3.65%. Found: C, 68.38%; H, 7.77%; N, 3.70%.

VOLi(CHSiMe$_3$)(CH$_2$SiMe$_3$)$_2$ (2)

Figure 7:
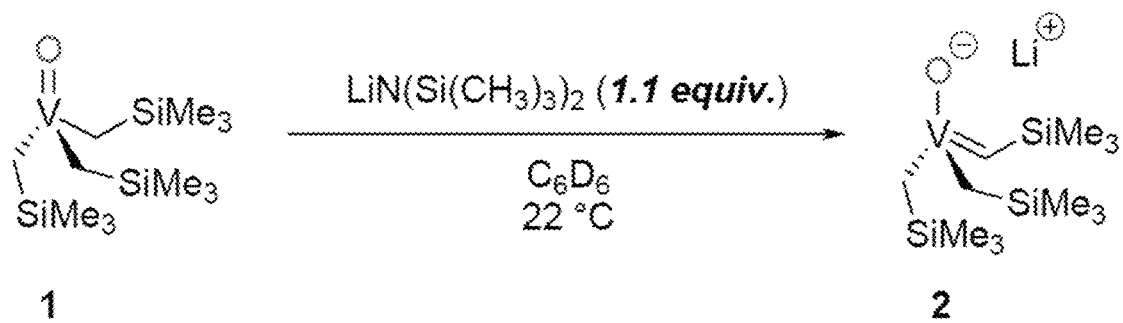
FIG. 7 shows a scheme for synthesis of complex 2 from complex 1.

A solution of LiHMDS (14 mg, 0.084 mmol, 1.1 equiv.) in 0.6 ml of C$_6$D$_6$ was added to stirred solid complex 1 (25 mg, 0.076 mmol, 1.0 equiv.) to generate the anionic alkylidene complex 2 in situ. Upon mixing, the solution changed from colorless to dark green. The reaction scheme is shown in FIG. 7.

$^1$H NMR: (C$_6$D$_6$, 400 MHz) δ 15.07 (s, 1H), 1.49 (d, J=10.6 Hz, 2H), 0.85 (d, J=10.6 Hz, 2H), 0.41 (s, 9H), 0.29 (s, 19H).

$^{13}$C NMR: (C$_6$D$_6$, 151 MHz) δ 303.9, 62.9, 2.6, 0.1.

Base Screening

Complex 1 (25 mg, 0.076 mmol, 1.0 equiv.) was mixed with a base (0.084 mmol, 1.1 equiv.) in 0.6 ml of C$_6$D$_6$. The resulting mixture was analyzed by $^1$H NMR.

1. LiHMDS gives a clean conversion to 2.
2. KHMDS leads to the formation of alkylidene, but peaks broadening was observed, suggesting the formation of paramagnetic species.
3. TMSCH$_2$Li leads to the formation of alkylidene, but peaks broadening was observed, suggesting the formation of paramagnetic species.
4. t-BuOK leads to the formation of alkylidene; however, the reaction of alkylidene with t-BuOH causes the slow decomposition of alkylidene to occur over a few hours.
5. Ph$_3$SiOK—no reaction.
6. NaH—decomposition.

The Reaction Between 2 and Ph$_3$SiOH

Figure 8:
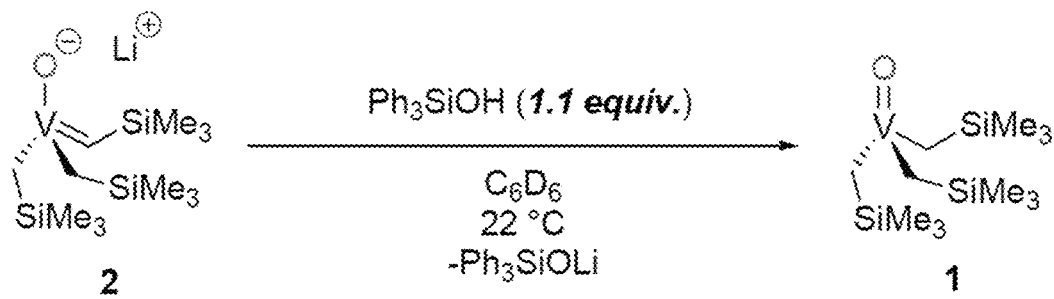
FIG. 8 shows a scheme for synthesis of complex 1 from complex 2.

A solution of LiHMDS (14 mg, 0.084 mmol, 1.1 equiv.) in 0.6 ml of C$_6$D$_6$ was added to stirred solid complex 1 (25 mg, 0.076 mmol, 1.0 equiv.) to generate the anionic alkylidene complex 2 in situ. The reaction was stirred at room temperature for 1 hour before the solid Ph$_3$SiOH (23.13 mg, 0.084 mmol, 1.1 equiv.) was added all at once, which turned the solution from dark green to brown. The reaction scheme and the reaction between complex 2 and Ph$_3$SiOH are shown in FIG. 8. NMR showed the formation of complex 1.

The Reaction Between 2 and Ph$_2$MeSiCl

Figure 9:
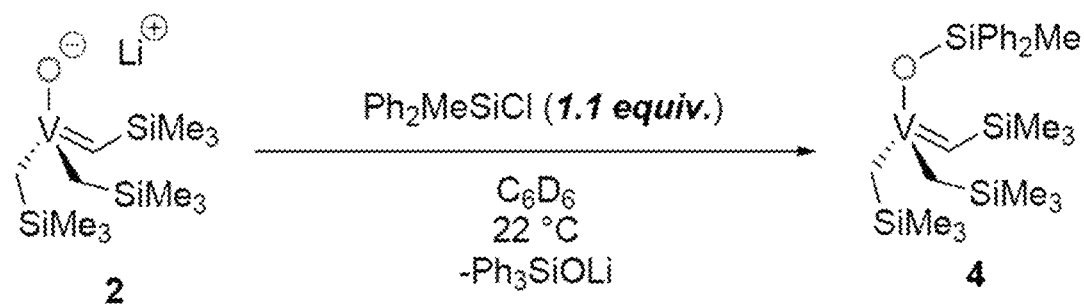
FIG. 9 shows a scheme for synthesis of complex 4 from complex 2.

A solution of LiHMDS (14 mg, 0.084 mmol, 1.1 equiv.) in 0.6 ml of C$_6$D$_6$ was added to stirred solid complex 1 (25 mg, 0.076 mmol, 1.0 equiv.) to generate the anionic alkylidene complex 2 in situ. The reaction was stirred at room temperature for 1 hour before Ph$_2$MeSiCl (19.48 mg, 0.084 mmol, 1.1 equiv.) was added dropwise. $^1$H NMR was taken after 1 hour at room temperature. The reaction scheme and the reaction between complex 2 and Ph$_2$MeSiCl are shown in FIG. 9.

DOSY NMR Experiment

Figure 10:
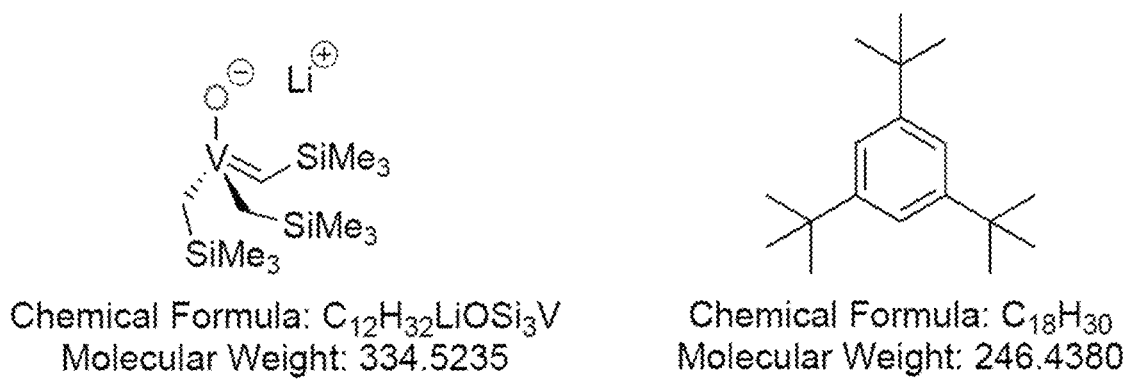
FIG. 10 shows DOSY NMR experiment for complex 2 in the presence of 1,3,5-tert-butylbenezene, including the chemical formulas and molecular weights (MW) for both complex 2 and 1,3,5-tert-butylbenezene.

DOSY experiment was performed in the presence of 1,3,5-tert-butylbenezene (FIG. 10 and Table 1).

TABLE 1

DOSY NMR experiment.

| Compound | Chemical shifts, ppm | logD [m2/s] | D | MW calc. | MW actual |
|---|---|---|---|---|---|
| Complex 2 | 15.07, 1.49, 0.85, 0.41, 0.29 | −9.25 | 5.62e−10 | 907.3 | — |
| 1,3,5-tert-butylbenezene | 7.38, 1.35 | −8.90 | 12.59e−10 | 168.5 | 246.4 |

MW was calculated using SEGWE software. DOSY experiment suggests that compound 2 forms oligomers in the C$_6$D$_6$ at 298K.

NBO Calculations

Geometry was optimized at the ωb97X-D level of density functional theory with the 6-31G* basis set. Then, the natural bond orbital (NBO) analysis was carried out at the ωb97X-D/cc-pVTZ level of theory to determine natural bond orders for chemical bonds (Table 2B and FIG. 11B) and partial charges on atoms (Table 2A and FIG. 11A). The calculations were carried out using the Gaussian 16 quantum chemistry program suit.

TABLE 2A

NBO calculations of natural charges.

| atom | charge |
|---|---|
| V | +1.15 |
| O | −0.88 |
| Li | +0.91 |
| C (from V═C) | −1.08 |
| C (from V—C) | −1.35 |
| Si (from V═C—Si) | +1.79 |
| Si (from V—C—Si) | +1.85, +1.86 |
| N | −0.52, −0.53 |

TABLE 2B

NBO calculations of bond orders.

| bond | order |
|---|---|
| V—O | 0.99 |
| V═C | 1.91 |
| V—C | 0.96, 0.97 |

X-Ray Structures

2·dtbbpy

C$_{60}$H$_{110}$Li$_2$N$_4$O$_2$Si$_6$V$_2$, crystallizes in the triclinic space group P1_ with a=13.09416(15)Å, b=15.8002(2)Å, c=18.3952(2)Å, α=101.0189(8)°, β=99.5205(9)°, γ=90.9343(9)°, V=3679.66(8)Å$_3$, Z=2, and d$_{calc}$=1.087 g/cm3. X-ray intensity data were collected on a Rigaku XtaLAB Synergy-S HPC area detector (HyPix-6000HE), employing confocal multilayer optic-monochromated Mo-Kα radiation (λ=0.71073 Å) at a temperature of 100K. Preliminary indexing was performed from a series of thirty 0.50 rotation frames with exposures of 1.5 seconds. A total of 1844 frames (12 runs) were collected employing ω scans with a crystal to detector distance of 34.0 mm, rotation widths of 0.5° and exposures of 5 seconds.

Rotation frames were integrated using CrysAlisPro, producing a listing of unaveraged F2 and σ(F2) values. A total of 111986 reflections were measured over the ranges 3.568≤2θ≤56.564°, −17≤h≤17, −21≤k≤21, −24≤l≤24 yielding 18275 unique reflections (Rint=0.0315). The intensity data were corrected for Lorentz and polarization effects and for absorption using SCALE3 ABSPACK (minimum and maximum transmission 0.8831, 1.0000). The structure was solved by direct methods —SHELXT. There are two molecules in the unit cell, both lying on crystallographic centers-of-symmetry (at ½, ½, ½ and ½, 0, 0). The t-Butyl group C15'-C16'-C17'-C18' was rotationally disordered with relative occupancies of 0.65/0.35. Refinement was by full-matrix least squares based on F2 using SHELXL-2018. All reflections were used during refinement. The weighting scheme used was w=1/[σ$^2$(Fo$^2$)+(0.0440P)$^2$+1.3232P] where P=(Fo$^2$+2F$_c^2$)/3. Non-hydrogen atoms were refined anisotropically and hydrogen atoms were refined using a riding model. Refinement converged to R1=0.0311 and wR2=0.0847 for 16153 observed reflections for which F>4σ (F) and R1=0.0361 and wR2=0.0871 and GOF=1.052 for all 18275 unique, non-zero reflections and 739 variables. The maximum Δ/σ in the final cycle of least squares was 0.001 and the two most prominent peaks in the final difference Fourier were +0.84 and −0.43 e/Å$^3$.

Figure 12A:
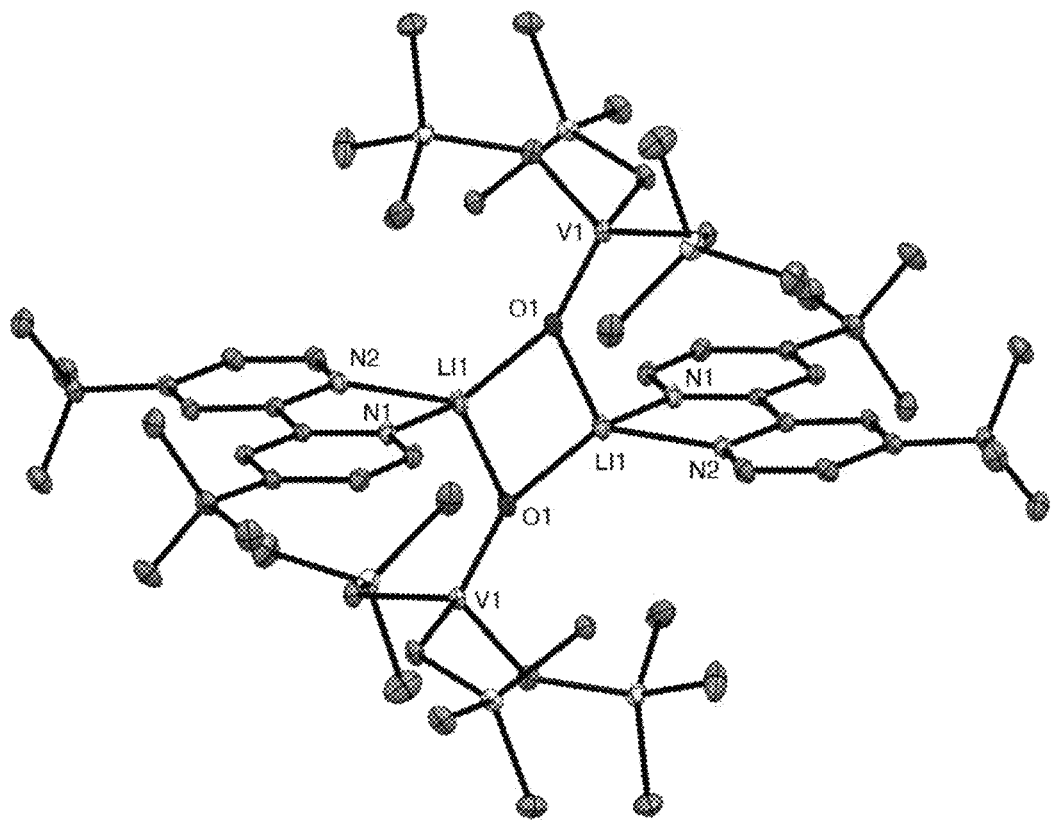
FIGS. 12A-12C show X-Ray structures of the complexes, including crystal structure of 2-dtbbpy (CCDC 2359503) (12A); Crystal structure of 6b (CCDC 2359502) (12B); and Crystal structure of 6c (CCDC 2359505) (12C).
Figure 12B:
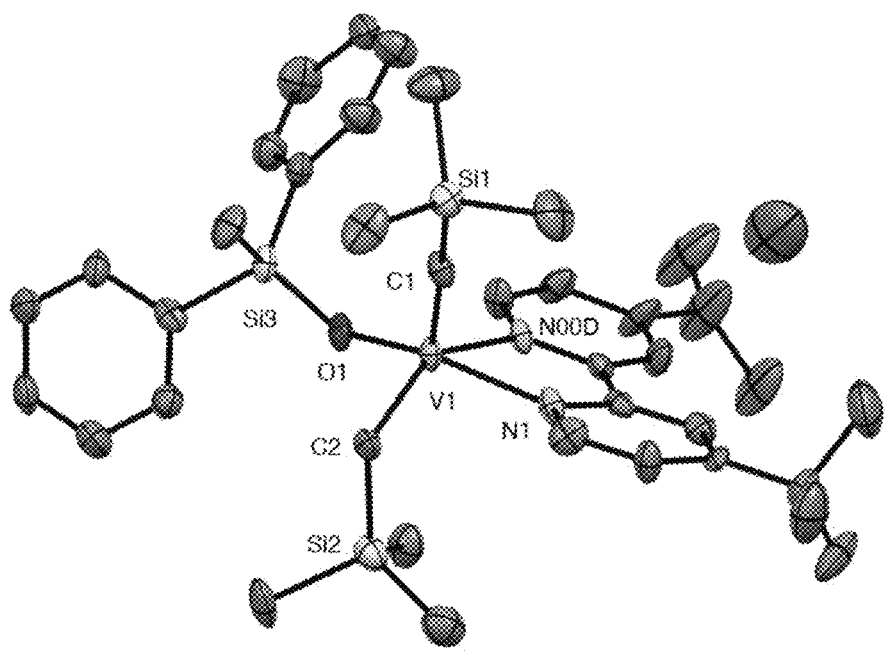
Figure 12C:
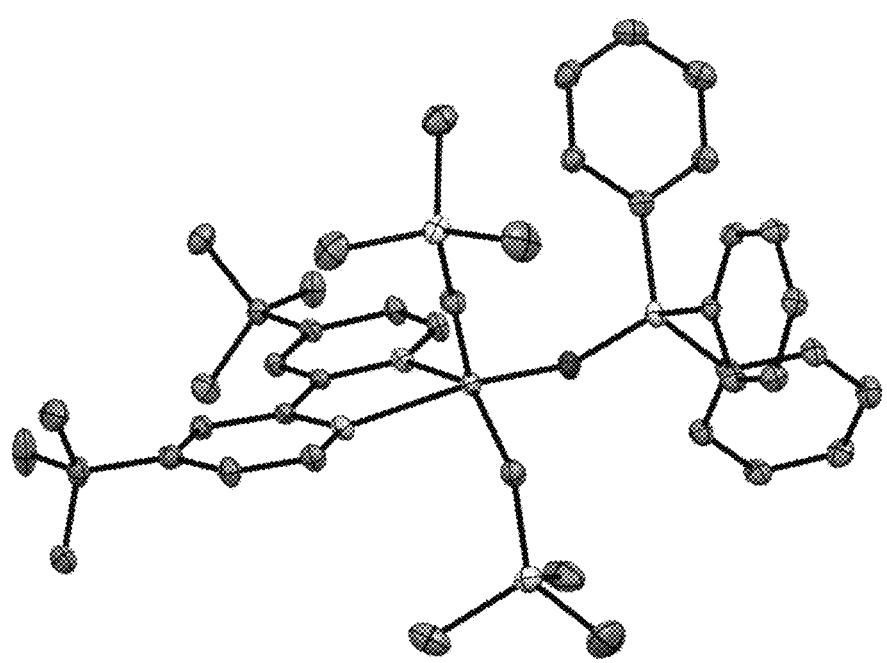

Tables 3A-3D list cell information, data collection parameters, and refinement data. The crystal structures are shown in FIGS. 12A-12C.

TABLE 3A

Crystal Data for complex 2·dtbbpy.
Crystal data

| | F(000) = 1300 |
|---|---|
| Chemical formula | $C_{60}H_{110}Li_2N_4O_2Si_6V_2$ |
| $M_r$ | 1203.81 |
| Crystal system, space group | Triclinic, P1 |
| Temperature (K.) | 100 |
| a, b, c (Å) | 13.09416(15), 15.8002 (2), 18.3952 (2) |
| α (°) | 101.0189 (8) |
| β (°) | 99.5205 (9) |
| γ | 90.9343 (9) |
| V (Å$^3$) | 3679.66 (8) |
| Z | 2 |
| Radiation type | Mo Kα |
| μ (mm$^{-1}$) | 0.39 |
| Crystal size (mm) | 0.25 × 0.18 × 0.18 |
| 2θ range for data collection | 3.568 – 56.564° |
| Index ranges | −17 ≤ h ≤ 17, −21 ≤ k ≤ 21, −24 ≤ l ≤ 24 |
| Reflections collected | 111986 |
| Independent reflections | 18275[R(int) = 0.0315] |
| Data/restraints/parameters | 18275/19/739 |
| Goodness-of-fit on F$^2$ | 1.052 |
| Final R indexes [I >= 2σ (I)] | $R_1$ = 0.0311, $wR_2$ = 0.0847 |
| Final R indexes [all data] | $R_1$ = 0.0361, $wR_2$ = 0.0871 |
| Largest diff. peak/hole | 0.84/−0.43 eÅ$^{-3}$ |

TABLE 3B

Crystal Data for complex 6b.
Crystal data

| | F(000) = 3032 |
|---|---|
| Chemical formula | $C_{39}H_{58}N_2OSi_3V$ |
| $M_r$ | 706.08 |
| Crystal system, space group | Monoclinic, P1$_{2/a}$ |
| Temperature (K.) | 273.15 |
| a, b, c (Å) | 26.032 (4), 11.5481 (17), 30.838 (5) |
| α (°) | 90 |
| β (°) | 103. 169 (15) |
| γ (°) | 90 |
| V (Å$^3$) | 9027 (2) |
| Z | 8 |
| $ρ_{calc}$ | 1.039 |
| Radiation type | Mo Kα (λ = 0.71073) |
| μ (mm$^{-1}$) | 0.327 |
| Crystal size (mm) | 0.2 × 0.15 × 0.1 |
| Data collection | |
| Diffractometer | Bruker D8 Quest PHOTON II |
| Absorption correction | Multi-scan |
| 2θ range for data collection/° | 4.756 to 50.41 |
| Index ranges | −31 ≤ h ≤ 31, −13 ≤ k ≤ 13, −36 ≤ l ≤ 36 |
| Reflections collected | 24107 |
| Independent reflections | 8049 [$R_{int}$ = 0.2624, $R_{sigma}$ = 0.3055] |
| Data/restraints/parameters | 8049/18/428 |
| Goodness-of-fit on F$^2$ | 1.019 |
| Final R indexes [I >= 2σ (I)] | $R_1$ = 0.1417, $wR_2$ = 0.2940 |
| Final R indexes [all data] | $R_1$ = 0.2801, $wR_2$ = 0.3656 |
| Largest diff. peak/hole/e Å$^{-3}$ | 0.56/−0.55 |

Computing Details

Data collection: Bruker APEX3; cell refinement: SAINT V8.401B; data reduction: SAINT V8.401B; program(s) used to solve structure: SHELXT 2018/2; program(s) used to refine structure: XL; molecular graphics: Olex2 1.3; software used to prepare material for publication: Olex2 1.3.

V(CSiMe$_3$)(dtbbpy)(CH$_2$SiMe$_3$)(OSiPh$_3$) (6c)

TABLE 3C

Crystal Data for complex 6c.
Crystal data

| Chemical formula | $C_{44}H_{59}N_2OSi_3V$ |
|---|---|
| $M_r$ | 767.14 |
| Crystal system, space group | P2$_{1/c}$ |
| Temperature (K.) | 170 |
| a, b, c (Å) | 11.130 (4), 29.284 (11), 13.734 (5) |
| β (°) | 100.816 (6) |
| V (Å$^3$) | 4397 (3) |
| Z | 4 |
| Radiation type | Mo Kα |
| μ (mm$^{-1}$) | 0.34 |
| Crystal size (mm) | 0.10 × 0.06 × 0.04 |
| Data collection | |
| Diffractometer | Bruker D8 Quest PHOTON II |
| Absorption correction | Multi-scan SADABS2016/2 (Bruker, 2016/2) was used for absorption correction. wR2(int) was 0.1008 before and 0.0769 after correction. The Ratio of minimum to maximum transmission is 0.6690. The λ/2 correction factor is Not present. |
| $T_{min}$, $T_{max}$ | 0.499, 0.745 |
| No. of measured, independent and observed [I > 2σ(I)] reflections | 31181, 7540, 4846 |
| $R_{int}$ | 0.084 |
| (sin θ/λ)max (Å$^{-1}$) | 0.590 |
| Refinement | |
| R[F$^2$ > 2σ(F$^2$)], wR(F$^2$), S | 0.077, 0.215, 1.09 |
| No. of reflections | 7540 |
| No. of parameters | 472 |
| H-atom treatment | H-atom parameters constrained $w = 1/[σ^2(F_o^2) + (0.0688P)^2 + 10.3264P]$ where $P = (F_o^2 + 2F_c^2)/3$ |
| Δρmax, Δρmin (e A$^{-3}$) | 0.67, −0.41 |

Computer programs: Bruker Apex3, SAINT V8.401B, SHELXT 2018/2, XL, Olex2 1.3.

Computing Details

Data collection: Bruker APEX3; cell refinement: SAINT V8.401B; data reduction: SAINT V8.401B; program(s) used to solve structure: SHELXT 2018/2; program(s) used to refine structure: XL; molecular graphics: Olex2 1.3; software used to prepare material for publication: Olex2 1.3.

TABLE 3D

Crystal Data for complex 6c.
Crystal data

| $C_{44}H_{59}N_2OSi_3V$ | F(000) = 1640 |
|---|---|
| $M_r$ = 767.14 | Dx = 1.159 Mg m$^{-3}$ |
| Monoclinic, P2$_{1/c}$ | Mo Kα radiation, λ = 0.71073 Å |
| a = 11.130 (4) Å | Cell parameters from 8127 reflections |
| b = 29.284 (11) Å | θ = 2.6-24.0° |

TABLE 3D-continued

Crystal Data for complex 6c.

Crystal data

| | |
|---|---|
| c = 13.734 (5) Å | μ = 0.34 mm$^{-1}$ |
| β = 100.816 (6)° | T = 170K |
| V = 4397 (3) Å$^3$ | Plate, brown |
| Z = 4 | 0.10 × 0.06 × 0.04 mm |

Data collection

| | |
|---|---|
| Bruker D8 Quest PHOTON II Diffractometer | $T_{min}$ = 0.499, $T_{max}$ = 0.745 |
| ω scans | 31181 measured reflections |
| Absorption correction: multi-scan SADABS2016/2 (Bruker, 2016/2) was used for absorption correction. wR2(int) was 0.0740 before and 0.0769 after correction. The Ratio of minimum to maximum transmission is 0.6690. The λ/2 correction factor is Not present. | 7540 independent reflections |
| | 4846 reflections with I > 2σ(I) |
| | $R_{int}$ = 0.084 |
| | $θ^{max}$ = 24.8°, $θ_{min}$ = 2.3° |
| | h = −13→13 |
| | k = −34→34 |
| | l = −15→16 |

Refinement

| | |
|---|---|
| Refinement on F$^2$ | Secondary atom site location: diffmap |
| Least-squares matrix: full | Hydrogen site location: inferred from neighboring sites |
| R[F$^2$ > 2σ(F$^2$)] = 0.033 | H-atom parameters constrained |
| wR(F$^2$) = 0.097 | w = 1/[σ$^2$(F$_o^2$) + (0.0688P)$^2$ + 10.3264P] |
| S = 1.07 | where P = (F$_o^2$ + 2F$_c^2$)/3 |
| 7540 reflections | (Δ/σ)max < 0.001 |
| 472 parameters | $Δ_{ρmax}$ = 0.67 e Å$^{-3}$ |
| 0 restraints | $Δ_{ρmin}$ = −0.41 e Å$^{-3}$ |
| Primary atom site location: dual | |

Special Details

Geometry. All e.s.d.'s (except the e.s.d. in the dihedral angle between two l.s. planes) are estimated using the full covariance matrix. The cell e.s.d.'s are taken into account individually in the estimation of e.s.d.'s in distances, angles and torsion angles; correlations between e.s.d.'s in cell parameters are only used when they are defined by crystal symmetry. An approximate (isotropic) treatment of cell e.s.d.'s is used for estimating e.s.d.'s involving l.s. planes.

Example 1—Synthesis of Alkylidyne Complexes

The examples provided herein exemplarily describe the development of a series of V oxo alkylidenes, a new class of compounds that exhibit unique reactivity in olefin metathesis. The key starting material for the synthesis of those catalysts is VO(CH$_2$TMS)$_3$ (complex 1). Complex 1 was made from the oxidation reaction between V(CH$_2$TMS)$_3$-THF and styrene oxide. The reaction was challenging and suffered from scalability and reproducibility. To improve the synthesis of complex 1, several reaction conditions and reagents were screened, including commercially available V(+5) oxo complexes and alkylating agents (TMSCH$_2$Li, TMSCH$_2$MgCl, (TMSCH$_2$)$_2$Zn, and (TMSCH$_2$)$_3$Al). FIG. 4 shows the optimal conditions for the scalable synthesis of complex 1.

The key finding is the use of 2.3 equiv of TMSCH$_2$MgCl (instead of 3.0 equiv) and VO(O$^i$Pr)$_3$ at −78° C. to avoid the reduction of V species, which can be easily seen by the appearance of a green color during the reaction.

Figure 13A:
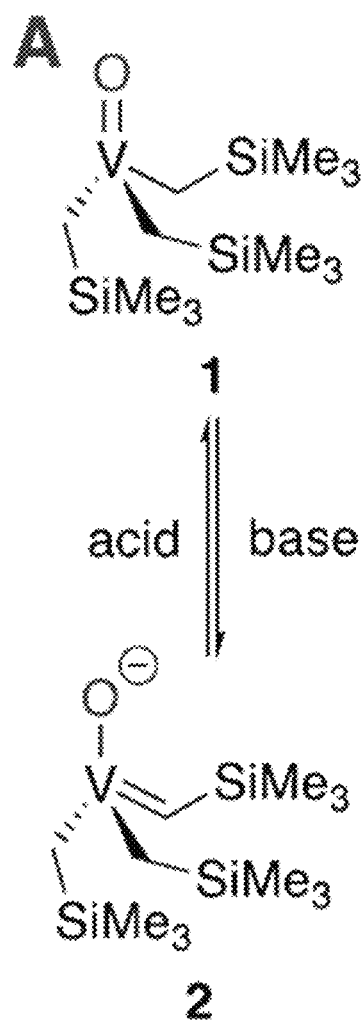
FIGS. 13A-13C show 13A: reversible intermolecular α-hydrogen abstraction to form anionic V alkylidene; 13B: synthesis and X-ray structure of 2-dtbbpy, thermal ellipsoids are shown at 30% probability, and hydrogen atoms are omitted for clarity; and 13C: comparison of structural parameters of 2-dtbbpy with reported four-coordinate V oxo alkylidene 3.

During the screening of optimal conditions, a new peak was observed in the alkylidene region by $^1$H NMR in the reactions in which an excess of alkylating agents was used. In separate experiments, it was found that complex 1 reacts with strong bases, including MN(TMS)$_2$ (M=Li or K), or organolithium reagents (RLi), to form the V anionic alkylidene 2 (FIGS. 7 and 13A). The reaction is reversible. Thus, the addition of 1 equiv of Ph$_3$SiOH to complex 2 leads to the formation of complex 1 (FIG. 8). Base screening showed that t-BuOK can deprotonate complex 1 (with the following decomposition of complex 2 in the presence of t-BuOH), but Ph$_3$SiOK does not lead to alkylidene formation. Therefore, the estimated p$K_a$ of complex 1 is between 16 and 18 (H$_2$O).

The intermolecular α-hydrogen abstraction to form alkylidenes from metal alkyl complexes is unusual as there are no reported instances of anionic alkylidenes forming from metal oxo alkyl species. This transformation is exciting by itself from a fundamental standpoint and can provide some crucial insights about the classical intramolecular α-hydrogen abstraction reaction.

Figure 13B:
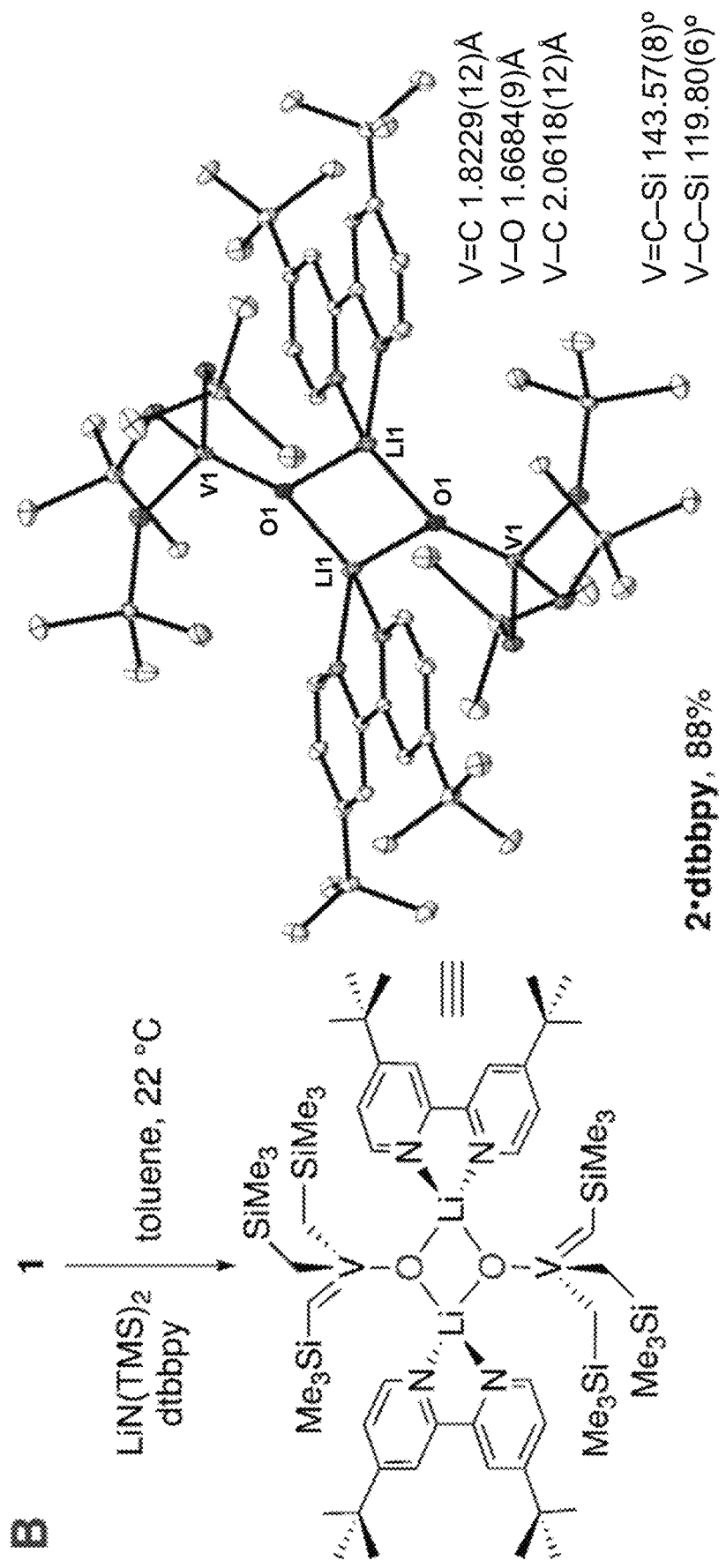

Complexes 2 (as Li or K salts) are stable and isolable but not crystalline. DOSY NMR experiment suggests that complex 2 (Li salt) forms oligomers in benzene solution. The crystalline Li salt of complex 2 was isolated as a 4,4'-bis (tert-butyl)-2,2'-bipyridine complex (2-dtbbpy) in 88% isolated yield (FIG. 13B).

Figure 13C:
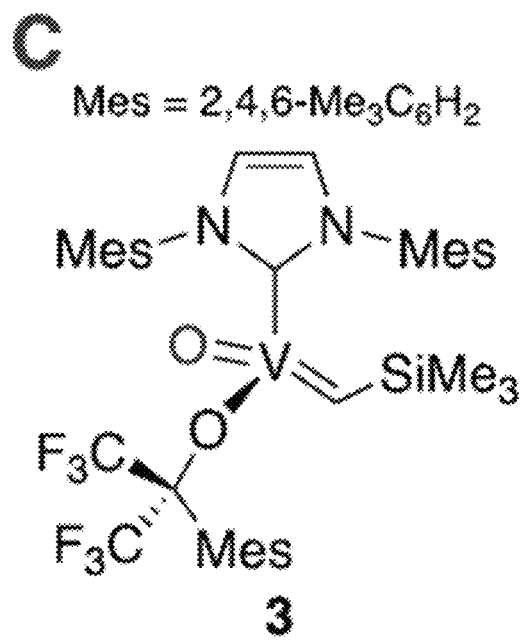

The X-ray structure of 2-dtbbpy revealed a dimer with bridged Li cations with a slightly distorted tetrahedral geometry at the V center. The comparison of structure details of 2-dtbbpy to the known four-coordinate tetrahedral V oxo alkylidene 3 confirmed the presence of one alkylidene and two alkyl groups (FIG. 13C). The V—O bond in 2-dtbbpy is elongated compared to the V=O bond in complex 3 (1.6684(9) Å vs 1.588(5) Å) but still shorter compared to the V—O bond in alkoxide (1.845(5) Å). It is worth noting that the V=C—Si angle (143.57(8)°) is significantly higher than the V=C—Si angle in complex 3 (130.5(5)°). This can be explained by a greater extent of α-hydrogen agnostic interaction in 2·dtbbpy.

Figure 11A:
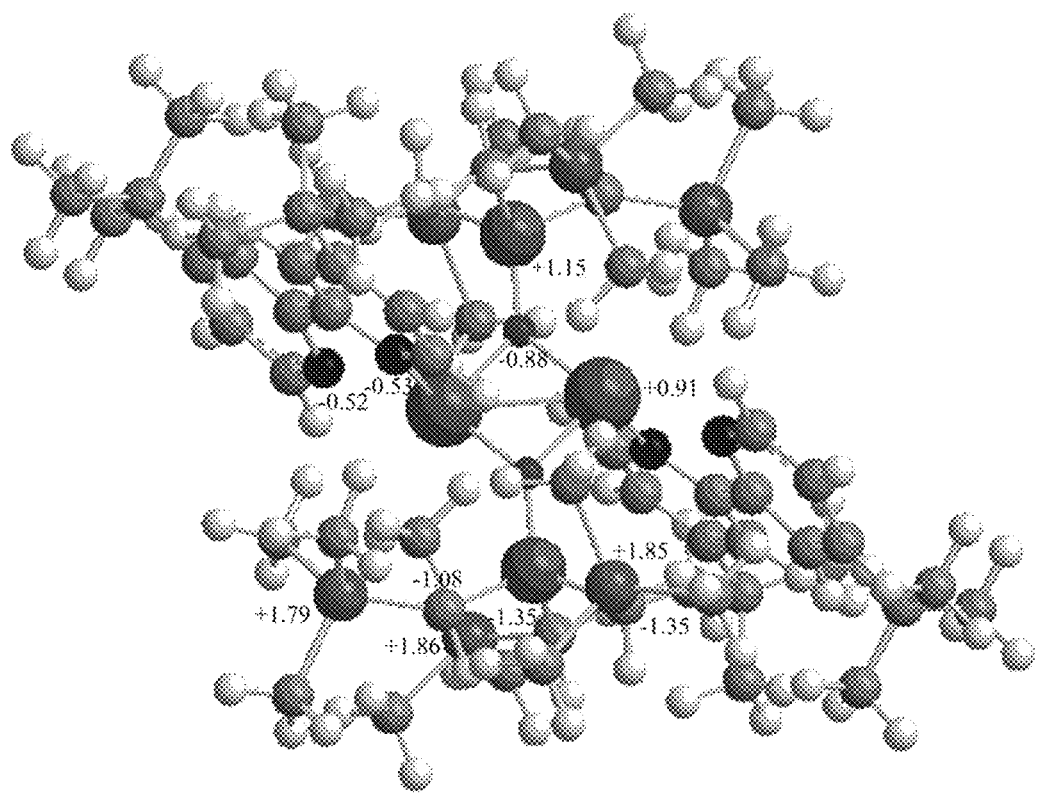
FIGS. 11A-11B show NBO calculations of natural charges on atoms (11A) and natural bond orders for chemical bonds (11B).
Figure 11B:
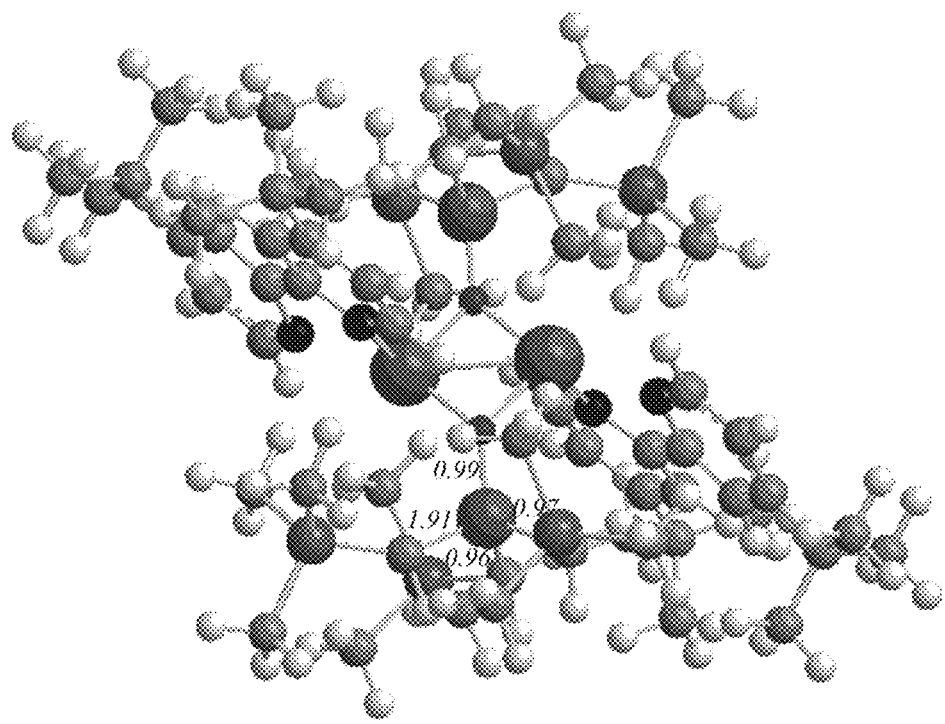

NBO calculations further support the structure of 2·dtbbpy. Thus, the computed V—O bond order is 0.99, with charges on the vanadium and oxygen atoms of +1.15 and −0.88, respectively (FIG. 11A). Bond orders of V=C and V—C are 1.91 and 0.97, respectively (FIG. 11B).

The resulting complex resembles a simple carbon-based enolate anion and might react with electrophiles, for example, with silyl chlorides, to provide siloxide complexes in analogy to the formation of enol silyl ethers, taking advantage of the strength of the Si—O bond. Indeed, complexes 2 (as a Li or K salt) slowly react with silyl chlorides to form new alkylidenes by $^1$H NMR that are assigned as V alkylidene siloxide complexes (FIG. 9). For example, the reaction between complex 2 and Ph$_2$MeSiCl after 1 hour at room temperature showing ~26% conversion to new alkylidenes (C$_6$D$_6$, 400 MHz, 22° C.). Similar to complex 2, the resulting complexes are not crystalline.

Figure 14:
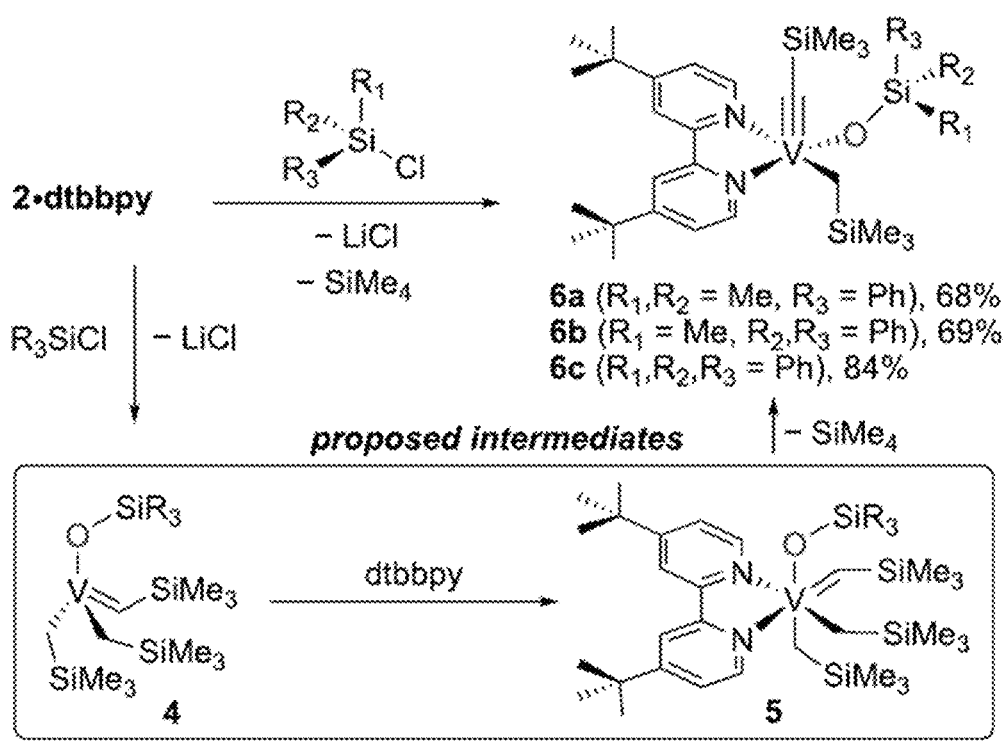
FIG. 14 shows a scheme for synthesis of V alkylidyne complexes 6a-c and proposed intermediates.

The reaction between 2-dtbbpy and silyl chlorides provides V alkylidyne complexes 6a-c (FIG. 14). The mechanism includes coordination of dtbbpy to V siloxide complex 4, which leads to complex 5 followed by intramolecular α-hydrogen abstraction to form alkylidynes 6a-c.

Figure 15:
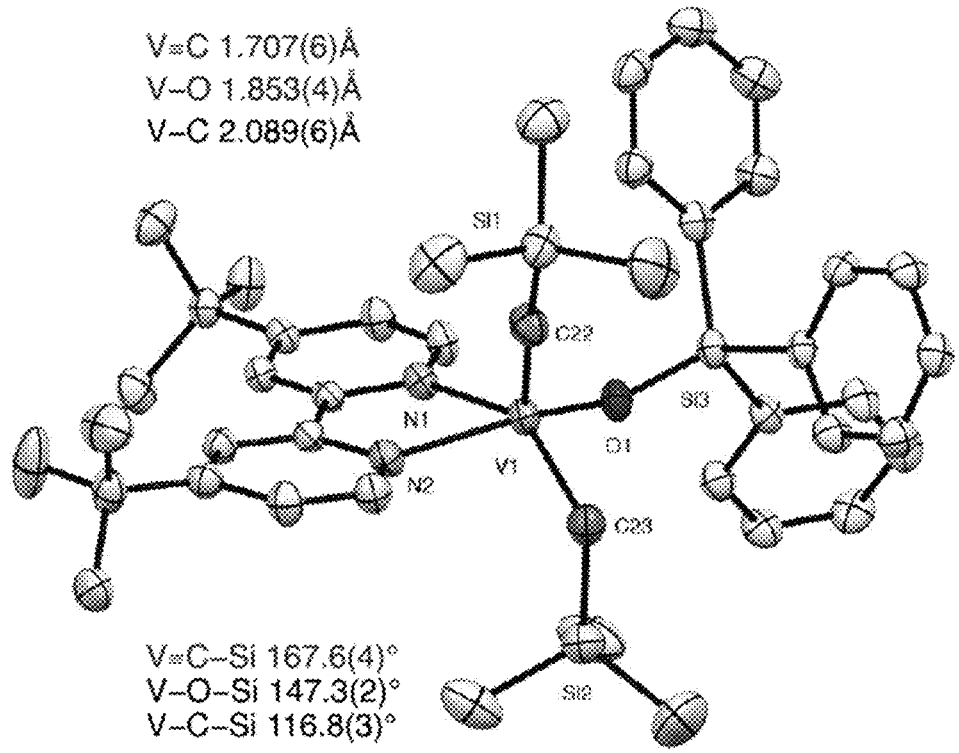
FIG. 15 shows a perspective view of the crystal structure of complex 6c with thermal ellipsoids is shown at 30% probability, and hydrogen atoms are omitted for clarity.

Complexes 6b (FIG. 12B) and 6c were successfully crystallized and studied by X-ray crystallography. The X-ray structure of 6c revealed that it has a distorted square pyramidal geometry (τ=0.18) with alkylidyne in the apical position (FIG. 15). The V≡C bond (1.707(6)Å) in five-coordinate 6c is slightly longer compared to the V≡C bond in reported four coordinate V alkylidyne (1.674 Å) and significantly shorter than the typical V=C bond (FIG. 13).

The V≡C—Si angle is 167.6(4)°, smaller than in the reported V alkylidyne (177.6°), but significantly larger than V=C—Si in 2-dtbbpy (143.57(8)°). The SiMe$_3$ alkylidyne group is tilted away from the OSiPh$_3$ group, presumably for steric reasons. Noteworthy, the V—O bond in complex 6c (1.853 (4)Å) is comparable to that in complex 3 (1.845(5)Å), supporting that complex 6c is indeed a V alkylidyne siloxide complex. The large V—O—Si (147.3(2)°) suggests the significant π-donation from the oxygen atom to V. The alkylidyne carbon in complex 6c has a chemical shift of 421 ppm in $^{13}$C NMR, which is more deshielded compared to known V alkylidynes (343-375 ppm). For comparison, the alkylidene carbon in complex 2-dtbbpy has a chemical shift of 343 ppm in $^{13}$C NMR. Therefore, the NMR and X-ray studies unambiguously confirm that complex 6c is a V alkylidyne siloxide complex. The resulting complexes resemble well-known Schrock Mo alkylidynes supported by siloxide and bipyridine (or phenanthroline) ligands.

The presented method is a rare example of converting an oxo ligand at V to a vanadium oxygen single bond (V=O to V—OR). From a fundamental standpoint, the illustrated transformation is an elegant strategy to convert early transition metal oxo alkyl complexes to siloxide alkylidynes.

The present invention provides a new synthetic pathway to produce d$^0$ V alkylidynes, an underdeveloped class of 3d Schrock carbynes. In a preferred embodiment, the process involves creating an anionic V alkylidene complex that contains a nucleophilic oxygen atom, making it reactive toward electrophiles such as silyl chlorides. Subsequent α-hydrogen abstraction from the alkylidene results in the formation of alkylidynes. The reactivity of the obtained complexes, for example, in alkyne metathesis, is further investigated.

Example 2—Reactivity Studies

Evidence of the Cycloaddition Step

Figure 16:
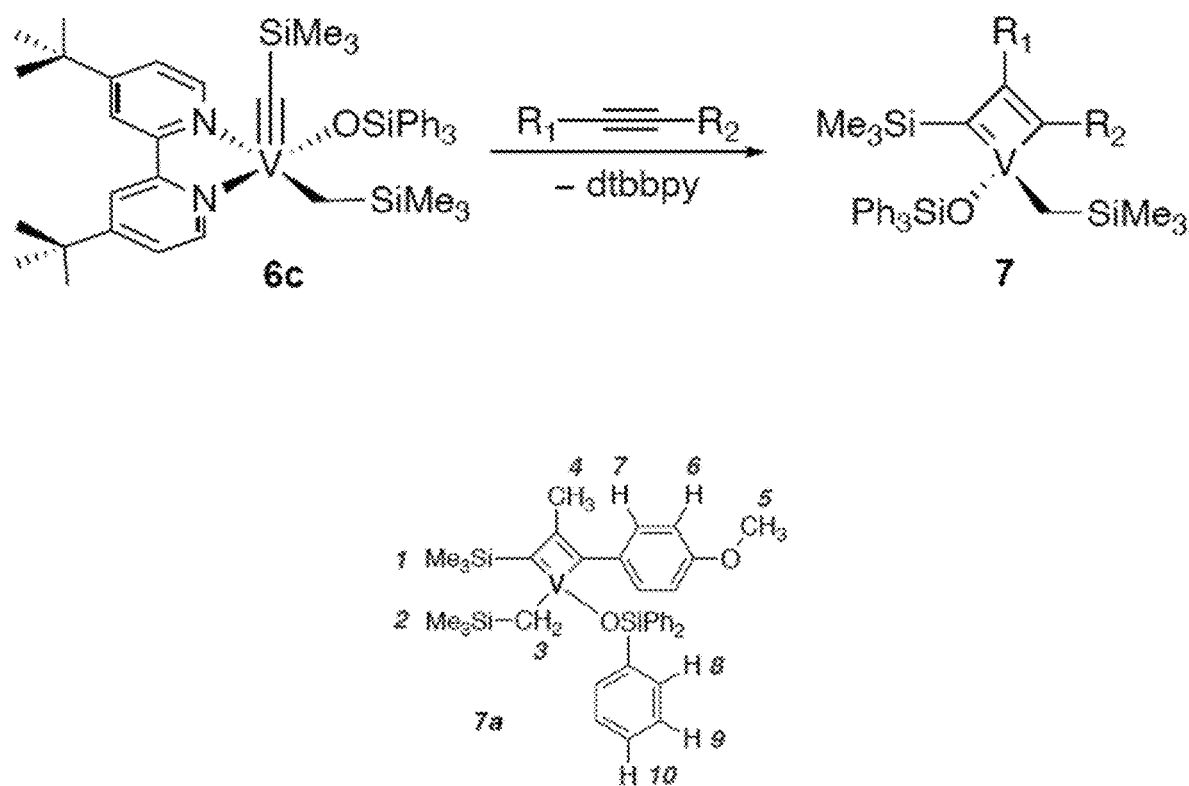
FIG. 16 shows cycloaddition reaction between complex 6c and alkynes (top) and representative $^1$H NMR spectrum of 7a in $C_6D_6$ (22° C.).

Further reactivity studies showed that the prepared V alkylidynes readily react with various internal alkynes to form MCBD complexes and free dtbbpy (FIG. 16, top). The formation of only one isomer of 7a (FIG. 16, bottom) was observed where the aryl group is attached to the α-carbon atom of MCBD, which is confirmed by the NOESY experiment.

DFT (Density Functional Theory) Studies

Figure 17:
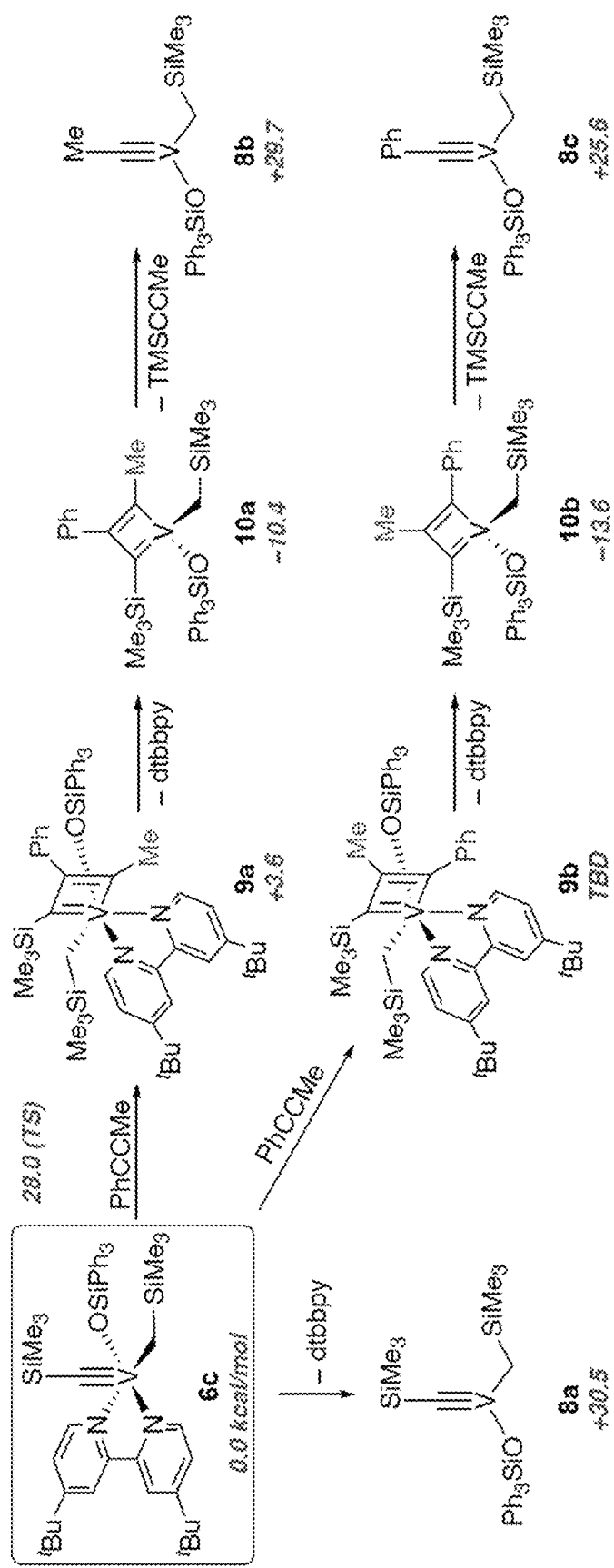
FIG. 17 shows DFT studies (under benzene solvation, B3LYP-D3, kcal/mol).

To probe the feasibility of the V-based alkyne metathesis, DFT studies of cycloaddition and cycloreversion steps with complex 6c were performed. The dissociation of dtbbpy to form 3-coordinate 8a is highly unfavorable (FIG. 17). One N atom of the bipyridine ligand could not be decoordinated from 6c, all calculations go back to the coordination of the two N atoms. Consequently, it's believed that the reaction proceeds through an associative pathway where an octahedral MCBD 9a is formed. In addition, the transition state for the cycloreversion step (6c→9a) were located, which is 28 kcal/mol. Therefore, cycloaddition via the associative pathway is feasible and can proceed, although slowly, at the reaction conditions.

In this case, the reaction takes a few hours to complete at room temperature or within one hour under heating at 50° C. This finding highlights the difference between classical alkyne metathesis systems and V reactivity. Thus, the Schrock catalysts are 4-coordinate alkylidynes that form 5-coordinate MCBDs. It is believed that the cycloaddition reaction via associative pathway results from the high electrophilicity of the V atom, which is confirmed spectroscopically. Thus, the $^{13}$C NMR chemical shift of the alkylidyne carbon is a valuable tool to access the electrophilicity of the metal center. The alkylidyne carbon in complex 6c has a chemical shift of 421 ppm, significantly higher than the corresponding chemical shift in typical Mo-based catalysts (~300 ppm).

The coordination of alkyne followed by the cycloaddition step proceeds trans to stronger σ-donor ligand (alkyl group in 6c and 9a), which aligns well with the known data. The dissociation of bipyridine ligand leads to thermodynamically favorable 10a, which corresponds with the experiments. The direct cycloreversion from 10a to form 8b is uphill. Therefore, the binding of bipyridine or other neutral ligands is necessary for the efficient cycloreversion step. However, in the case of 10a, the energy barrier to form 6c is 38.4 kcal/mol, which would require substantial heating. Unfortunately, observed V MCBDs decompose above 80° C. Alternatively, the use of strongly donating neural ligands is required to lower the energy barrier of the cycloreversion step.

Figure 18:
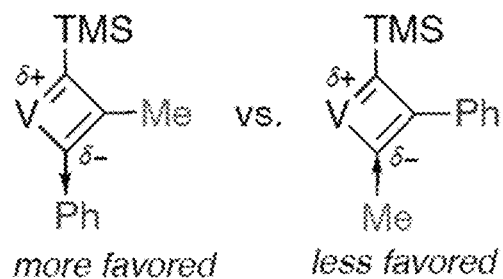
FIG. 18 shows MCBD stability.

The ground state of the MCBD isomer 10b was also calculated (FIG. 17, bottom), which has a lower energy compared to 10a. Indeed, the reaction between 6c and PhC≡CMe leads to only one MCBD 10b, the structure was confirmed by the NOESY experiment. It is believed that V—C bond is highly polarized with a significant negative charge at α-carbon atom in MCBD, which is stabilized by the phenyl group in 10b (FIG. 18).

Figure 19:
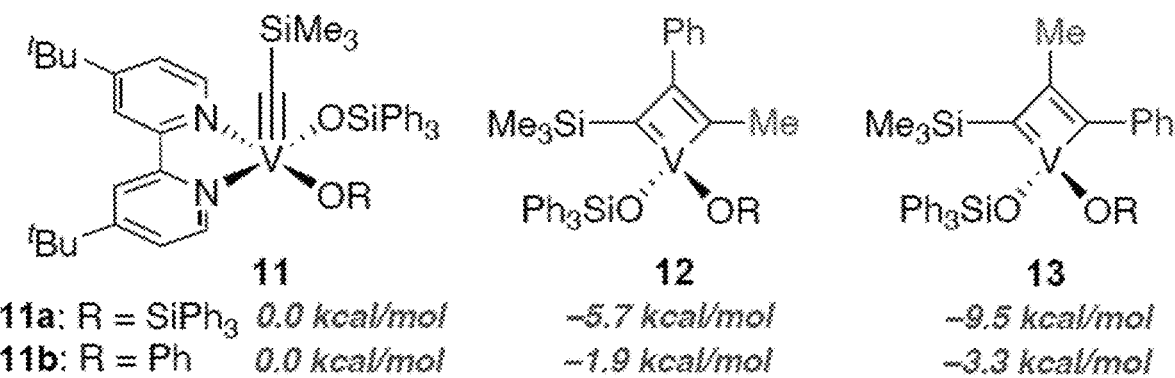
FIG. 19 shows calculated relative Gibbs free energies under benzene solvation (B3LYP-D3).

The influence of the anionic ligand at V on the stability of MCBD was explored. The result shows that the substitution of the alkyl group in 10b with siloxide and phenoxide ligands increases the energy of MCBD (FIG. 19), making the cycloreversion step more feasible. This might be because the extent of π-donation from the anionic ligand play an important role in stability of MCBD. Thus, more π-donating OPh ligand leads to MCBDs (12b and 13b) with a higher energy than MCBDs containing OSiPh$_3$ (12a and 13a). The ligand donor parameter (LDP) was utilized to compare the electronic properties of anionic ligands (smaller LDP corresponds to more electron-donating anionic ligands, LDP$_{Oph}$=12.38, LDP$_{OSiPh3}$=13.28).

Evidence of the Cycloreversion Step

Figure 20A:
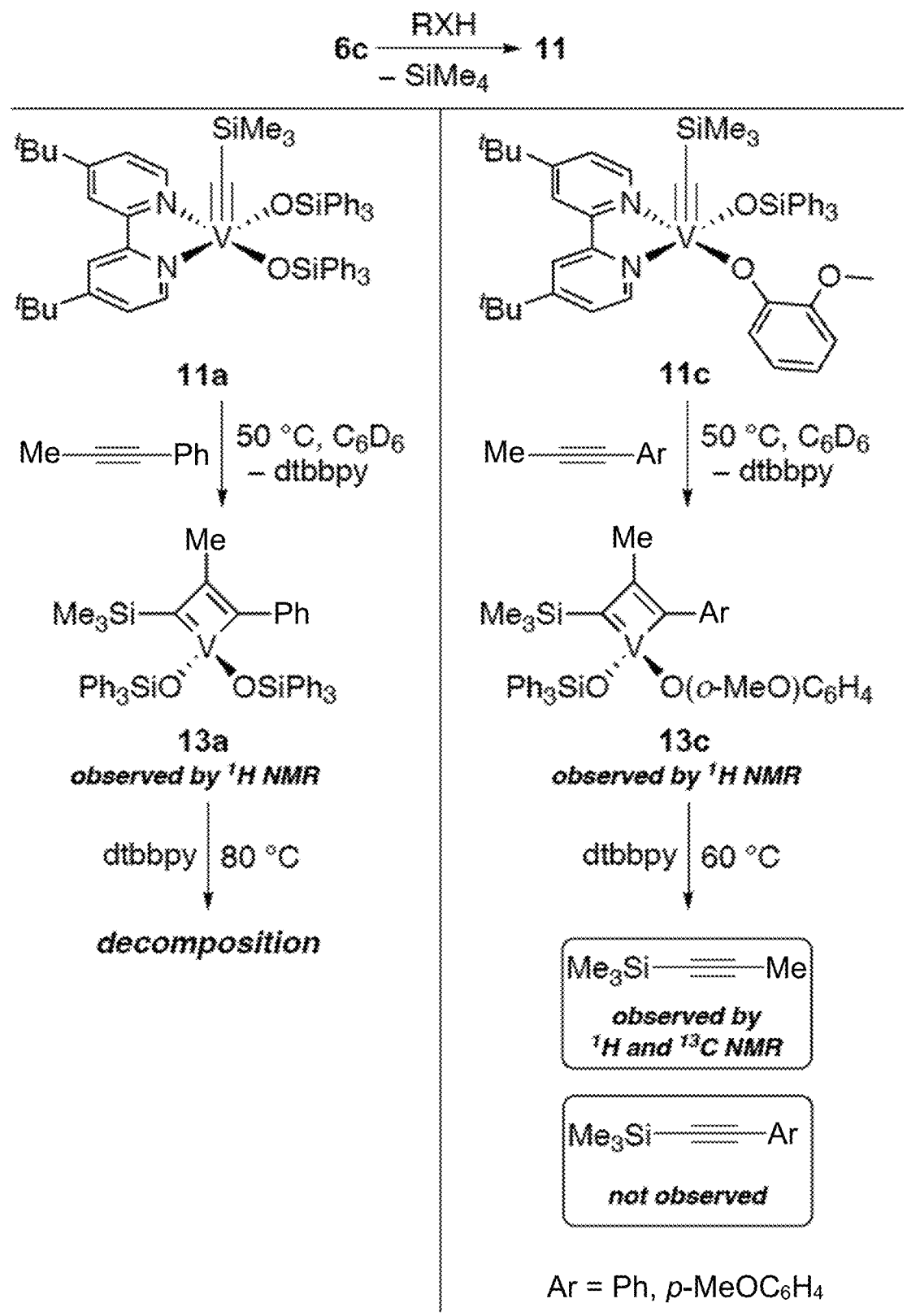
FIGS. 20A-20C show prepared V alkylidynes, their reactivity toward PhC≡CMe (20A, 20B and 20C), and evidence of the cycloreversion step for complex 13c (20A).
Figure 20B:
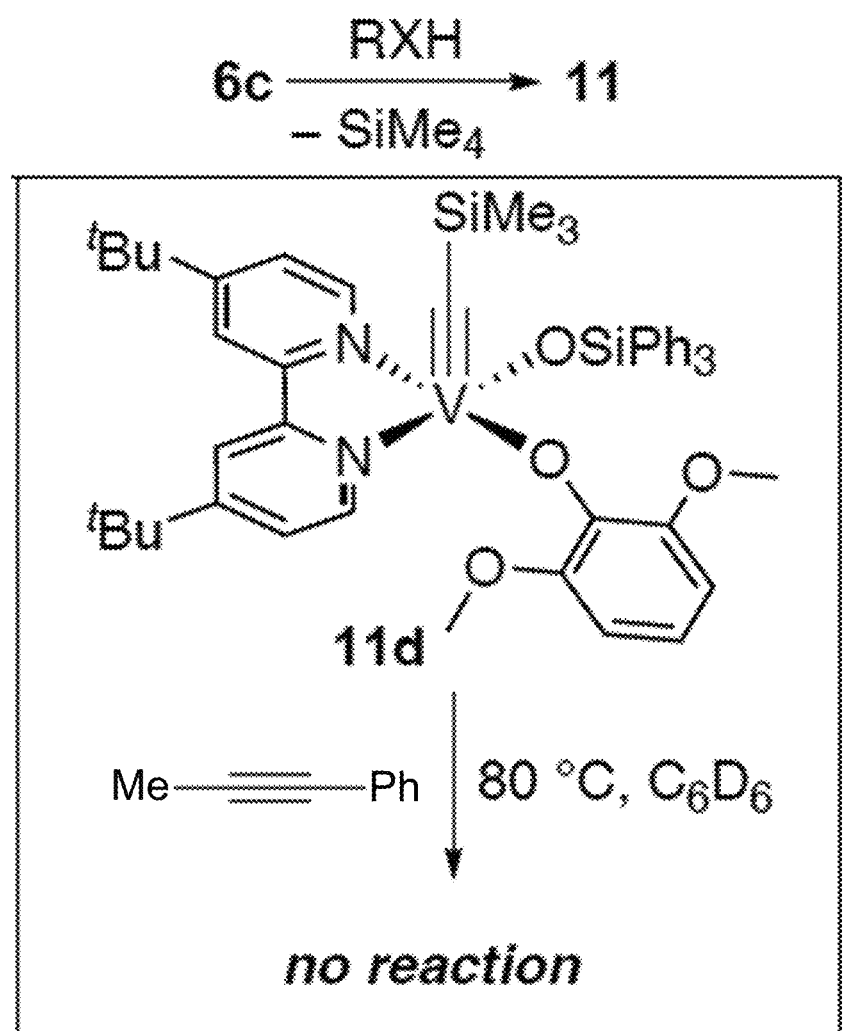
Figure 20C:
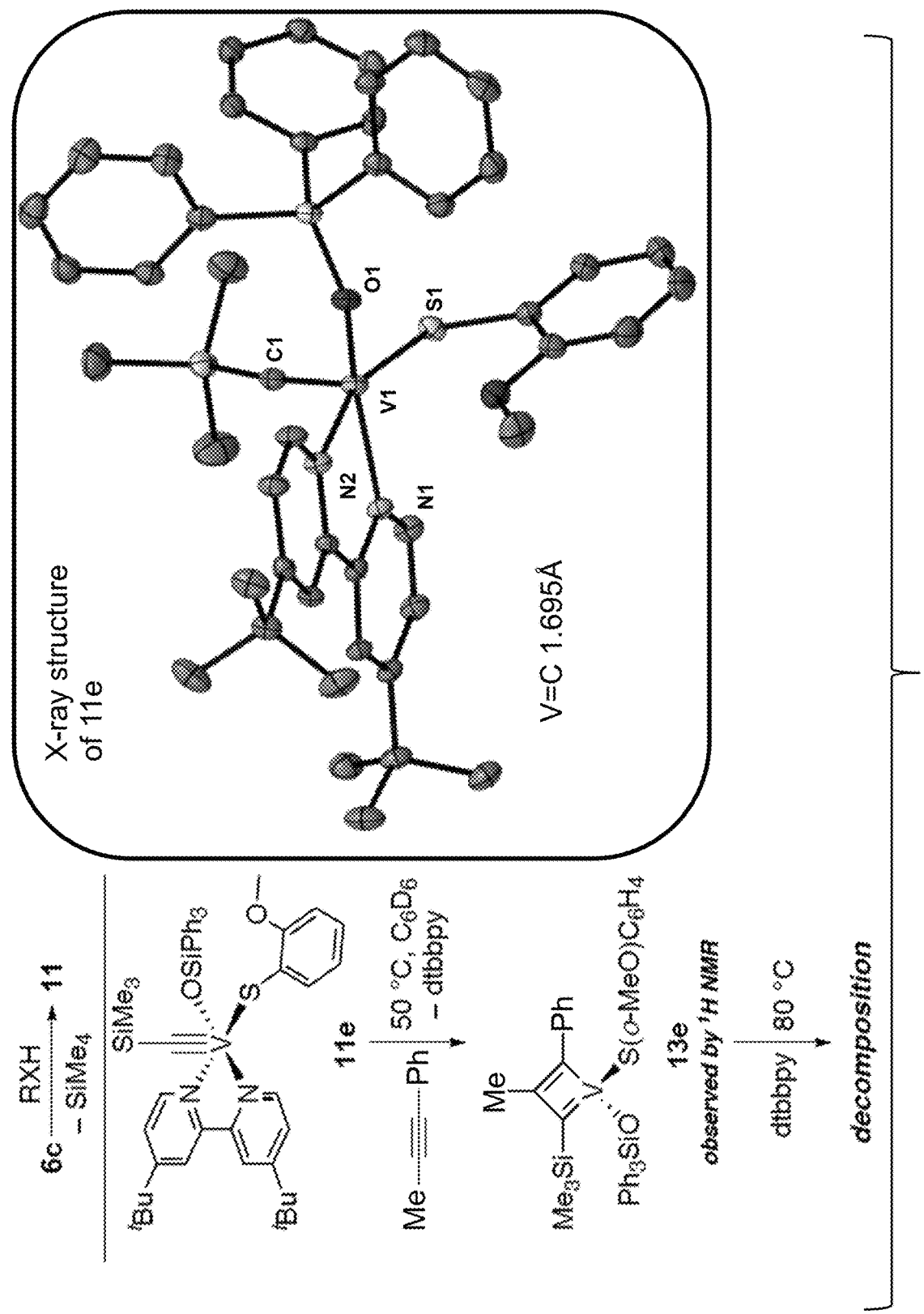

Complex 6c reacts with silanols, phenols, and thiophenols in Et$_2$O at RT to form complexes 11 (FIGS. 20A-20C, top). Four complexes 11a, 11c-e were isolated and characterized and the X-ray structure of 11e was obtained (FIG. 20C, right), confirming the presents of a V alkylidyne ligand. Thus, the V≡C bond distance in 11e (1.695 A) is comparable to that in 6c (1.707 A).

The reactivity of the complexes 11 with internal alkynes was explored. Complexes 11a, 11c, and 11e reacted with PhC≡CMe at 50° C. to form corresponding MCBDs. Interestingly, complex lid does not react with PhC≡CMe even at 80° C. (lid decomposes above 80° C.). This observation supports the associative pathway. Thus, the bulky 2,6-(MeO)$_2$C$_6$H$_3$O ligand might prevent the coordination of the alkyne to the V center, which is crucial to initiate the cycloaddition step.

The formation of only one isomer of MCBD in all three cases (13a, 13c, and 13e) and free bipyridine ligand were observed by $^1$H NMR. It was observed that 13c showed evidence of the cycloreversion step. Thus, heating the reaction mixture led to the formation of Me$_3$SiC≡CMe, which was detected by $^1$H and $^{13}$C NMR. The observed transformation is the first reported alkyne metathesis with a first-row metal. The MeO-group in the ortho position of the phenoxide ligand might play a role in the cycloreversion step by binding to the V center in complex 13c. To reproduce the cycloreversion reaction, 6c was reacted with p-MeOC$_6$H$_4$C≡CMe, which led to the formation of Me$_3$SiC≡CMe.

Based on the reactivity studies, it can be concluded:
1. The cycloreversion step requires the formation of a five- or six-coordinated MCBD. It is believed that the coordination of strongly donating ligands is necessary for following alkyne dissociation for two reasons: 1) to lower electrophilicity (Lewis acidity) of the V metal center; 2) to increase a steric bulk around V. Therefore, coordination of a neutral (or anionic) ligand to 13 is preferred for the alkyne metathesis reactions.
2. The electronic properties of the anionic ligand are essential for the efficient cycloreversion step. Thus, it is believed that the π-donating anionic ligands are necessary to destabilize the MCBD 13, that is confirmed by DFT and experimentally. The π-donating abilities decrease in the row o-MeOC$_6$H$_4$O>Ph$_3$SiO>o-MeOC$_6$H$_4$S (LDP=12.14, 13.28, and 14.22, respectively), explaining why the cycloreversion reaction only in the case of o-MeOC$_6$H$_4$O (13c) was observed.
3. The steric properties of the ligands are important for the cycloaddition step, which proceeds via an associative pathway. The use of bulky 2,6-(MeO)$_2$C$_6$H$_3$O ligand prevents the coordination of the alkyne for the efficient cycloaddition reaction.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application and the scope of the appended claims. These examples should not be construed as limiting. In addition, any elements or limitations of any invention or embodiment thereof disclosed herein can be combined with any and/or all other elements or limitations (individually or in any combination) or any other invention or embodiment thereof disclosed herein, and all such combinations are contemplated within the scope of the invention without limitation thereto.

What is claimed is:

1. A vanadium alkylidyne complex having a general formula of V(≡C—R)X$_n$L$_{4-n}$, or a salt thereof, wherein n is 1, 2 or 3;
   X is an anionic ligand and each is independently selected from —CH$_2$SiMe$_3$, a silane ligand, a siloxide ligand, a phenoxide ligand, an alkoxide ligand, an alkylthio ligand, an arylthiol ligand, a thioalkoxide ligand, a halide ligand, and an iminato ligand, or two X together form a bidentate ligand;
   L is a neutral ligand and each is independently selected from a pyridine ligand, a nitrile ligand, an ether ligand, a thioether ligand, a phosphine ligand, a N-heterocyclic carbene (NHC) ligand, and a cyclic(alkyl)(amino)carbene (CAAC) ligand, or two L together form a bidentate ligand; and
   R is alkyl, aryl or —Si(R$^a$)$_3$, wherein R$^a$ is selected from alkyl, substituted alkyl, aryl, and substituted aryl.

2. The vanadium alkylidyne complex of claim 1, having a general formula of:

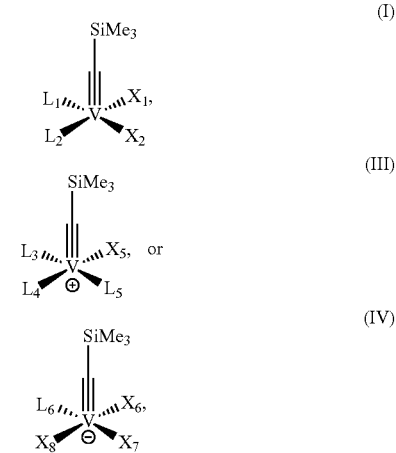

wherein X$_1$, X$_2$, X$_5$, X$_6$, X$_7$ and X$_8$ are each independently selected from halogens, silyl, alkylthio, arylthiol, alkoxides, thioalkoxides, siloxides, iminato, phenoxides, NCO, NCS, and —CH$_2$SiMe$_3$, or X$_1$ and X$_2$ together form a bidentate ligand, or two of X$_6$, X$_7$ and X$_8$ together form a bidentate ligand; and
L$_1$, L$_2$, L$_3$, L$_4$, L$_5$ and L$_6$ are each independently selected from phosphines, NHCs, pyridines, nitriles, ethers, thioethers, CAACs and substituted forms thereof, or L$_1$ and L$_2$ together form a bidentate ligand, or two of L$_3$, L$_4$, and L$_5$ together form a bidentate ligand.

3. The vanadium alkylidyne complex of claim 2, wherein X$_1$, X$_2$, X$_5$, X$_6$, X$_7$ and X$_8$ are each independently selected from —CH$_2$SiMe$_3$, —OPh, —SPh, —OSiPh$_3$, —OSiMePh$_2$, —OSi(p-MeOC$_6$H$_4$)$_3$, —OSiMe$_2$Ph, o-MeOC$_6$H$_4$O—, m-MeOC$_6$H$_4$O—, p-MeOC$_6$H$_4$O—, o-MeOC$_6$H$_4$S—, m-MeOC$_6$H$_4$S—, p-MeOC$_6$H$_4$S—, 2,6-(MeO)$_2$C$_6$H$_3$O—, 2,5-(MeO)$_2$C$_6$H$_3$O—, 2,4-(MeO)$_2$C$_6$H$_3$O—, 2,3-(MeO)$_2$C$_6$H$_3$O—, 3,4-(MeO)$_2$C$_6$H$_3$O—, 3,5-(MeO)$_2$C$_6$H$_3$O—, —OC(CF$_3$)$_3$, —OCPh(CF$_3$)$_2$, —OCMe(CF$_3$)$_2$, —OCMe$_2$CF$_3$, —OCMe$_3$, —O-adamantyl (—OAd), —OBu$^t$F$_6$, —OC$_6$F$_5$, —I, —F, —Cl, —Br, and

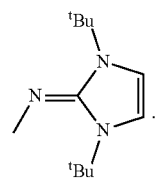

4. The vanadium alkylidyne complex of claim 2, wherein L$_1$, L$_2$, L$_3$, L$_4$, L$_5$ and L$_6$ are each independently selected from —PMe$_3$, —PEt$_3$, —NC$_5$H$_5$, —NC$_5$H$_4$Br, —N≡C—CMe$_3$,

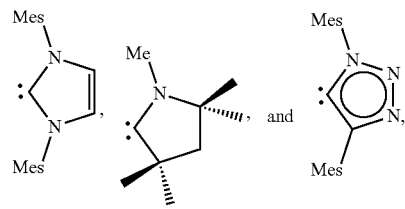

or L₁ and L₂ together form a bipyridine ligand, or two of L₃, L₄, and L₅ together form a bipyridine ligand.

5. The vanadium alkylidyne complex of claim 1, having a general formula of:

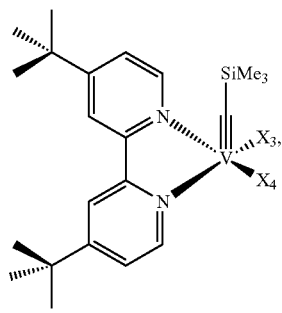

(II)

wherein each of $X_3$ and $X_4$ is independently selected from —CH$_2$SiMe$_3$, —OPh, —SPh, —OSiPh$_3$, —OSiMePh$_2$, —OSi(p-MeOC$_6$H$_4$)$_3$, —OSiMe$_2$Ph, o-MeOC$_6$H$_4$O—, m-MeOC$_6$H$_4$O—, p-MeOC$_6$H$_4$O—, o-McOC$_6$H$_4$S—, m-MeOC$_6$H$_4$S—, p-MeOC$_6$H$_4$S—, 2,6-(MeO)$_2$C$_6$H$_3$O—, 2,5-(MeO)$_2$C$_6$H$_3$O—, 2,4-(MeO)$_2$C$_6$H$_3$O—, 2,3-(MeO)$_2$C$_6$H$_3$O—, 3,4-(MeO)$_2$C$_6$H$_3$O—, 3,5-(MeO)$_2$C$_6$H$_3$O—, —OC(CF$_3$)$_3$, —OCPh(CF$_3$)$_2$, —OCMe(CF$_3$)$_2$, —OCMe$_2$CF$_3$, —OCMe$_3$, —OAd, —OBu$^f$F$_6$, —OC$_6$F$_5$, —F, —Cl, —Br, and

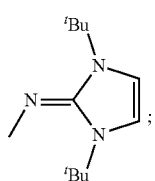

or $X_3$ and $X_4$ together form a bidentate ligand.

6. The vanadium alkylidyne complex of claim 1, being

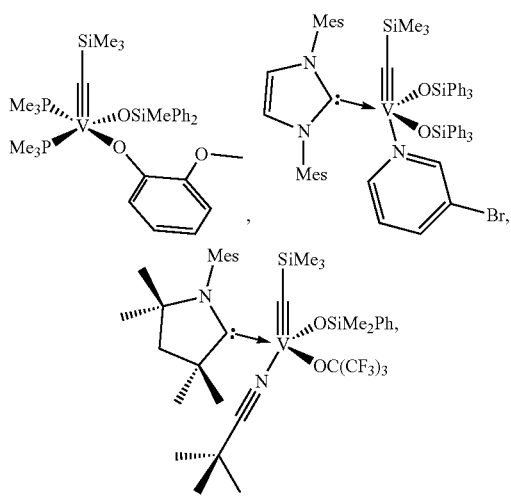

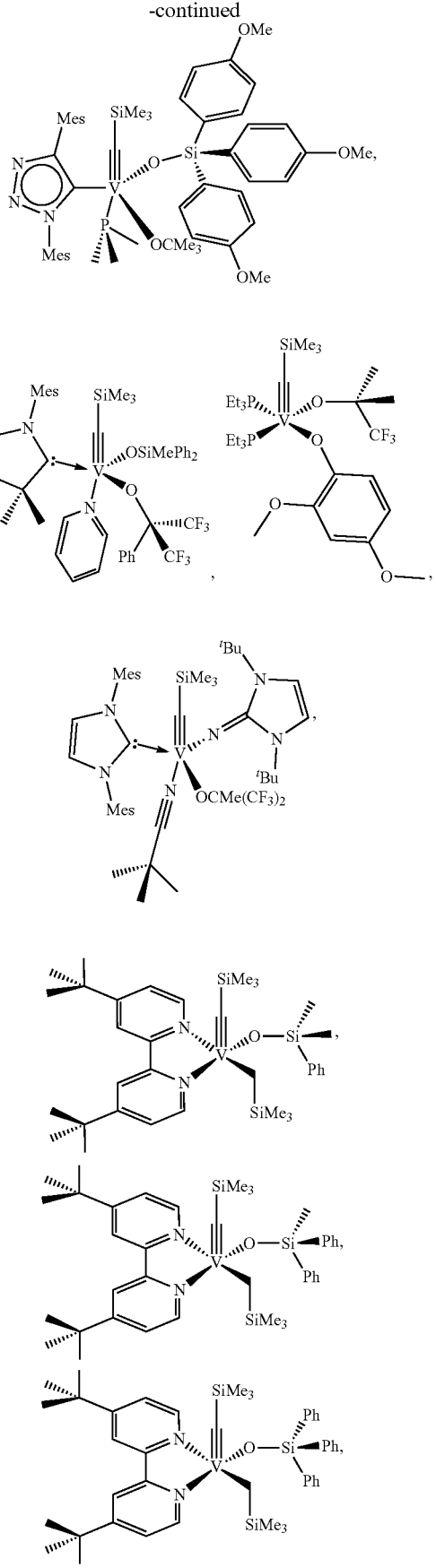

-continued
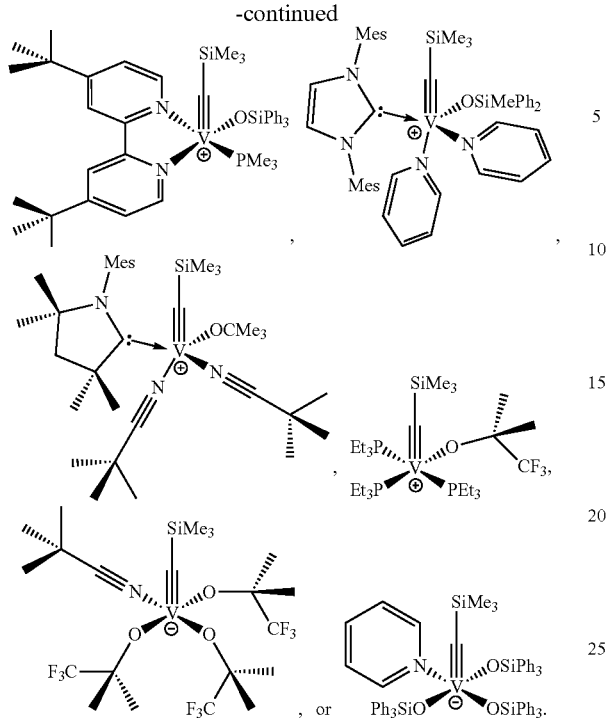
7. A composition comprising the vanadium alkylidyne complex, or a salt thereof, of claim 1.
* * * * *